(12) United States Patent
Lee et al.

(10) Patent No.: US 12,222,534 B1
(45) Date of Patent: Feb. 11, 2025

(54) OPTICAL FILM

(71) Applicant: LMS Co., Ltd., Pyeongtaek-si (KR)

(72) Inventors: Byeonghun Lee, Pyeongtaek-si (KR);
Hyeonuk Park, Pyeongtaek-si (KR);
Dongkyu Lee, Pyeongtaek-si (KR);
Changgoo Park, Pyeongtaek-si (KR)

(73) Assignee: LMS Co., Ltd., Pyeongtaek-si (KR)

( * ) Notice: Subject to any disclaimer, the term of this patent is extended or adjusted under 35 U.S.C. 154(b) by 0 days.

(21) Appl. No.: 18/650,132

(22) Filed: Apr. 30, 2024

(30) Foreign Application Priority Data

Jan. 24, 2024 (KR) ........................ 10-2024-0011197

(51) Int. Cl.
*F21V 8/00* (2006.01)
(52) U.S. Cl.
CPC ......... *G02B 6/0051* (2013.01); *G02B 6/0053* (2013.01)
(58) Field of Classification Search
CPC ..... G02B 5/124; G02B 6/0051; G02B 6/0053
See application file for complete search history.

(56) References Cited

U.S. PATENT DOCUMENTS

| | | | |
|---|---|---|---|
| 2009/0244739 A1 | 10/2009 | Chang | |
| 2015/0226999 A1 | 8/2015 | Fuchida et al. | |
| 2020/0379159 A1 | 12/2020 | Li et al. | |
| 2023/0104462 A1* | 4/2023 | Chen | G02F 1/133603 362/97.1 |

FOREIGN PATENT DOCUMENTS

| KR | 10-2014-0066237 A | 5/2014 |
|---|---|---|
| KR | 10-2016-0056499 A | 5/2016 |

OTHER PUBLICATIONS

KR Patent Office, Notice of Submission of Opinions for Application No. 10-2024-0011197, Sep. 19, 2024.

* cited by examiner

*Primary Examiner* — Robert J May
(74) *Attorney, Agent, or Firm* — NKL Law; Jae Youn Kim

(57) ABSTRACT

Provided is an optical film comprising a first base portion; a pyramid pattern layer including a plurality of pyramid patterns formed on a first surface of the first base portion and a first side of a base of the pyramid pattern arranged in a pyramid direction; and a first prism pattern layer including a plurality of first prism patterns formed on a second surface of the first base portion and an edge of the first prism pattern arranged in a prism direction.

20 Claims, 22 Drawing Sheets

| Content | Example 1-1 | Example 1-2 |
|---|---|---|
| Viewing Angle Distribution |  |  |
| Optimal Incident Angle (θ) | 65° | 73° |
| Optimal Viewin Angle (Φ) | 45° | 45° |

| Angle | α = 0° | α = 15° | α = 30° |
|---|---|---|---|
| Moire Phenomenon Simulation |  |  |  |
| Angle | α = 40° | α = 45° | α = 50° |
| Moire Phenomenon Simulation |  |  |  |
| Angle | α = 60° | α = 75° | α = 90° |
| Moire Phenomenon Simulation |  |  |  |

| Conten | Embossed Pyramid + Reversed Prism | Intaglio Pyramid + Reversed Prism |
|---|---|---|
| Viewing Angle Distribution 1 | | |
| Brightness | 100% | 113% |
| Φ | 32° | 30% |
| θ | 57° | 55% |

FIG. 12

|  | Example 2-1 | Example 2-2 | Example 2-3 | Example 2-4 |
|---|---|---|---|---|
| Base Portion R.I. | n1.65 | | | |
| Reversed Prism R.I. | n1.49 | | | |
| Pyramid R.I. | n1.49 | n1.58 | n1.69 | n1.49 |
| HLAS-V Viewing Angle Distribution |  |  |  |  |
| Brightness | 100.00% | 101.35% | 82.33% | 95.82% |

OPTICAL FILM

CROSS-REFERENCE TO RELATED APPLICATION(S)

This application is based on and claims priority under 35 U.S.C. 119 to Korean Patent Application No. 10-2024-0011197, filed on Jan. 24, 2024, in the Korean Intellectual Property Office, the disclosure of which is herein incorporated by reference in its entirety.

TECHNICAL FIELD

Various embodiments of the present specification relate to an optical film used for a liquid crystal display (LCD) device.

BACKGROUND

In general, a liquid crystal display (LCD) device may include a backlight unit that uniformly irradiates light across the entire screen of an electronic device. The backlight unit may include a light source, a light guide plate, a diffusion sheet, and an optical film including a prism sheet. Light emitted from the light source is transmitted upward through the light guide plate and the light transmitted upward is diffused through the diffusion sheet and then transmitted to the liquid crystal panel through the optical film provided at the upper portion.

Display devices being developed recently are gradually becoming thinner, and accordingly, backlight units are also required to be manufactured in a thinner manner. For the backlight units, development is underway to eliminate relatively thick diffusion sheets. For example, research is being developed to remove or replace the diffusion sheet from embodiments of the backlight unit that include a light source, a light guide plate, a diffusion sheet, and a prism sheet.

The diffusion sheet may form a diffusion layer on one side and/or the other side of the diffusion sheet. The diffusion layer generally contains light diffuser beads. The diffusion sheet may also spread light provided from a light source and a light guide plate over a wider area than when the light is directed to the prism sheet while acting as a shielding sheet that lowers visibility to the light source. Because the diffusion sheet is generally thick and has the disadvantage of improving the brightness of the backlight unit, efforts are being made to replace it.

For an example, the thickness of the backlight unit can be reduced while the brightness can be improved by replacing the diffusion sheet with a sheet including a pyramid pattern and a reversed prism pattern as disclosed in various embodiments of the present disclosure below. However, when a sheet including a pyramid pattern and a reversed prism pattern is used instead of the diffusion sheet, a problem of moiré phenomenon may occur depending on the arrangement of the pyramid pattern and the reversed prism pattern.

Through various embodiments, the present disclosure may provide an optical film showing excellent performance in preventing the shape of the light source from being recognized (referred to as 'shielding performance') without using a thick diffusion sheet as well as showing higher brightness (referred to as 'brightness performance') for a liquid crystal display (LCD) device. Additionally, when a sheet including a pyramid pattern and a reversed prism pattern is used instead of a diffusion sheet, various embodiments of an optical film for effectively avoiding the moiré phenomenon can be provided.

SUMMARY

An object of the present disclosure is to provide an optical film which may reduce and/or prevent moiré phenomenon for a backlight unit of a liquid crystal display (LCD) device.

Another object of the present disclosure is to provide an optical film which may contribute to thinning of a backlight unit of a liquid crystal display (LCD) device by not providing a thick diffusion sheet because the optical film of the present disclosure has excellent shielding performance against a light source and excellent brightness performance.

According to an embodiment of the disclosure, an optical film is provide to comprises a first optical sheet including a first base portion; a pyramid pattern layer including a plurality of pyramid patterns formed on a first surface of the first base portion and a first side of a pyramid base of the pyramid pattern arranged in a pyramid direction; and a first prism pattern layer including a plurality of first prism patterns formed on a second surface of the first base portion and an edge of the first prism pattern arranged in a first prism direction where the optical film satisfies either Equation 1 or Equation 2:

$$\frac{n \cdot (pi1-1)}{2} < pi2 < n \cdot pi1 \text{ or} \qquad \text{[Equation 1]}$$

$$\frac{n \cdot (pi1-1)}{2} > pi2, \qquad \text{[Equation 2]}$$

where pi1 is a first pitch corresponding to a length of the first side of the pyramid base of the pyramid pattern; pi1-1 is a first prime pitch corresponding to a diagonal length of the pyramid base of the pyramid pattern; pi2 is a second pitch corresponding to a base length of the first prism pattern; and n is a natural number.

In an embodiment, the optical film satisfies the Equation 3:

$$\frac{n \cdot pi1 \cdot (\sin\alpha + \cos\alpha)}{2} \neq pi2, \qquad \text{[Equation 3]}$$

where α is an angle formed between the pyramid direction of the first side of the pyramid base of the pyramid pattern and the first prism direction of the edge of the first prism pattern and n is the natural number.

In an embodiment, the optical film satisfies the Equation 4:

$$30° < \alpha < 60° \qquad \text{[Equation 4]},$$

where α is the angle formed between the pyramid direction of the first side of the pyramid base of the pyramid pattern and the first prism direction of the edge of the first prism pattern and n is the natural number.

In an embodiment, the plurality of pyramid patterns is formed as intaglio pyramid patterns for the optical film.

In an embodiment, the optical film further comprises that a second optical sheet including a second base portion; and a second prism pattern layer having a plurality of second prism patterns formed on a first surface of the second base portion and an edge of the second prism pattern arranged in a second prism direction where the second optical sheet is disposed over the first optical sheet.

In an embodiment, the second optical sheet includes a first diffusion layer formed on a second surface of the second base portion and the first diffusion layer faces the pyramid pattern layer for the optical film.

In an embodiment, the optical film further comprises that a third optical sheet including a third base portion; and a third prism pattern layer having a plurality of third prism patterns formed on a first surface of the third base portion and an edge of the third prism pattern arranged in a third prism direction where the third optical sheet is disposed over the second optical sheet.

In an embodiment, the third optical sheet includes a second diffusion layer formed on a second surface of the third base portion and the second diffusion layer faces the second prism pattern layer for the optical film.

In an embodiment, the third prism direction of the edge of the third prism pattern is substantially perpendicular to the second prism direction of the edge of the second prism pattern for the optical film.

In an embodiment, a refractive index of the pyramid pattern layer and a refractive index of the first prism pattern layer are smaller than a refractive index of the first base portion, respectively, for the optical film.

According to another embodiment of the present disclosure, a backlight unit is provided to comprise that an edge type light source; and an optical film disposed over the light source further comprising a first optical sheet including a first base portion; a pyramid pattern layer including a plurality of pyramid patterns formed on a first surface of the first base portion and a first side of a pyramid base of the pyramid pattern arranged in a pyramid direction; and a first prism pattern layer including a plurality of first prism patterns formed on a second surface of the first base portion and an edge of the first prism pattern arranged in a first prism direction where the optical film satisfies either Equation 5 or Equation 6:

$$\frac{n \cdot (pi1-1)}{2} < pi2 < n \cdot pi1 \text{ or} \quad \text{[Equation 5]}$$

$$\frac{n \cdot (pi1-1)}{2} > pi2, \quad \text{[Equation 6]}$$

where pi1 is a first pitch corresponding to a length of the first side of the pyramid base of the pyramid pattern; pi1-1 is a first prime pitch corresponding to a diagonal length of the pyramid base of the pyramid pattern; pi2 is a second pitch corresponding to a base length of the first prism pattern; and n is a natural number.

In another embodiment, the optical film satisfies the Equation 7:

$$\frac{n \cdot pi1 \cdot (\sin\alpha + \cos\alpha)}{2} \neq pi2 \quad \text{[Equation 7]}$$

where α is an angle formed between the pyramid direction of the first side of the pyramid base of the pyramid pattern and the first prism direction of the edge of the first prism pattern and n is the natural number for the optical film in the backlight unit.

In another embodiment, the optical film satisfies the Equation 8:

$$30° < \alpha < 60° \quad \text{[Equation 8]},$$

where α is an angle formed between the pyramid direction of the first side of the pyramid base of the pyramid pattern and the first prism direction of the edge of the first prism pattern and n is the natural number for the optical film in the backlight unit.

In another embodiment, the plurality of pyramid patterns is formed as intaglio pyramid patterns for the optical film in the backlight unit.

In another embodiment, the backlight unit is provided to further comprises a second optical sheet including a second base portion; and a second prism pattern layer having a plurality of second prism patterns formed on a first surface of the second base portion and an edge of the second prism pattern arranged in a second prism direction where the second optical sheet is disposed over the first optical sheet.

In another embodiment, the second optical sheet includes a first diffusion layer formed on a second surface of the second base portion and the first diffusion layer faces the pyramid pattern layer in the backlight unit.

In another embodiment, the backlight unit is provided to further comprises that a third optical sheet including a third base portion; and a third prism pattern layer having a plurality of third prism patterns formed on a first surface of the third base portion and an edge of the third prism pattern arranged in a third prism direction where the third prism direction of the edge of the third prism pattern is substantially perpendicular to the second prism direction of the edge of the second prism pattern and the third optical sheet is disposed over the second optical sheet.

In another embodiment, the third optical sheet includes a second diffusion layer formed on a second surface of the third base portion and the second diffusion layer faces the second prism pattern layer in the backlight unit.

In another embodiment, the edge type light source is arranged in a first direction substantially perpendicular to the third prism direction and is formed to irradiate light in a second direction substantially parallel to the third prism direction in the backlight unit.

In another embodiment, a refractive index of the pyramid pattern layer and a refractive index of the first prism pattern layer are smaller than a refractive index of the first base portion, respectively, for the optical film in the backlight unit.

BRIEF DESCRIPTION OF THE DRAWINGS

The above-described or other aspects, configurations and/or advantages of an embodiment of the present disclosure may become clearer through the following detailed description with reference to the accompanying drawings.

FIG. 12 is a table comparing an embossed pyramid pattern and an intaglio pyramid pattern according to various embodiments.

DETAILED DESCRIPTION

Figure 1:
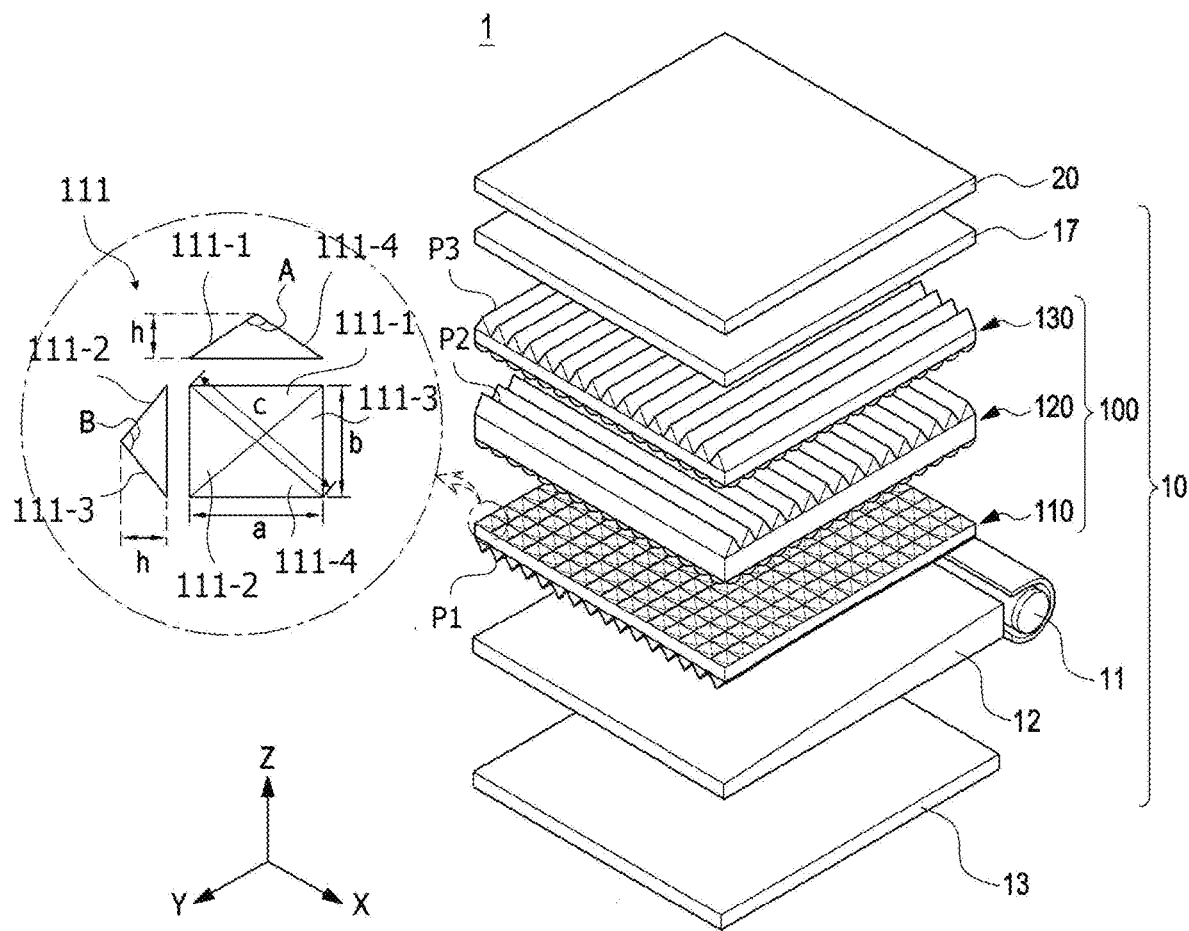
FIG. 1 is a perspective view showing a liquid crystal display (LCD) device including an optical film according to an embodiment.

Various embodiments and terms used in the specification are not intended to limit the technical features described in the specification to specific embodiments, but it should be understood to include various modifications, equivalents, or substitutions of the embodiments. In connection with the description of the drawings, similar reference numerals may be used for similar or related components. The singular form of the noun corresponding to the item may include one or more of the elements unless the relevant context clearly dictates otherwise.

According to various embodiments, each component (e.g., module or program) of the above-described components may include a single or plural entity, and some of the plurality of entities may be separately placed in other components. According to various embodiments, one or more of the components or operations described above may be omitted, or one or more other components or operations may be added. Multiple components (e.g., modules or programs) may be alternatively or additionally integrated into a single component. In this case, the integrated component may perform one or more functions of each component of the plurality of components in the same or similar manner as those performed by the corresponding component of the plurality of components prior to the integration. According to various embodiments, operations performed by a module, program, or other component may be executed sequentially, in parallel, iteratively, or heuristically, or one or more of the operations may be executed in a different order or omitted. Alternatively, one or more other operations may be added.

Various embodiments will be described with reference to the associating drawings. In describing the prevent embodiments, the same names and the same symbols are used for the same components, and additional description will be omitted. In addition, in describing embodiments of the present disclosure, it is clear in advance that the same names and same symbols are used for components having the same function, but that they are not substantially the same as the conventional ones.

According to various embodiments, terms such as "comprise" or "have" are intended to designate the presence of a feature, number, step, operation, component, part, or combination described in the specification. It should be understood, however, that the above does not preclude the possibility of addition or existence of one or more of other features, or numbers, steps, operations, components, parts, or combinations.

FIG. 1 is a perspective view showing a liquid crystal display (LCD) device including an optical film according to an embodiment. In the detailed description below, a longitudinal direction (a vertical direction) of a liquid crystal display (LCD) device 1 may be referred to as a 'Y-axis direction', a lateral direction (a horizontal direction) may be referred to as an 'X-axis direction', and/or a height direction (a thickness direction) may be referred to as a 'Z-axis direction.' Additionally, in some embodiments, the direction where a component is oriented may be referred to as 'negative/positive (−/+)' along with the orthogonal coordinate system illustrated in the drawing. As shown in FIG. 1, if the term 'negative/positive (−/+)' is not written in the orthogonal coordinate system, the coordinate axis may be interpreted as pointing in the + direction unless otherwise defined. For example, 'X-axis direction' can be interpreted as pointing to the +X-axis direction, and 'Y-axis direction' can be interpreted as pointing to the +Y-axis direction. 'Z-axis direction' can be interpreted as pointing to the +Z-axis direction. For example, referring to FIG. 1, if a second sheet 120 is disposed over a first sheet 110, it can be defined as being the second sheet 120 placed from the first sheet 110 on the '+Z axis direction.' For example, referring to FIG. 4A, it can be defined that one surface (e.g., a first side 112a) of a first base portion 112 is a surface facing the '+Z-axis direction and the other surface (e.g., a second surface 112b) is a surface facing the '−Z axis direction.'

According to an embodiment, in the description of an optical film 100, the direction where light from the light source travels may be expressed as, for example, '+Z-axis direction.' In explaining the direction below, heading toward one of the three axes of the orthogonal coordinate system may include heading in a direction parallel to the axis. Note that this is based on the orthogonal coordinate system described in the drawings for brevity of explanation, and that the description of directions or components does not limit the various embodiments of the present disclosure.

Referring to FIG. 1, the liquid crystal display (LCD) device 1 may include a backlight unit 10 and a liquid crystal panel 20. According to various embodiments, the backlight unit 10 may face the rear surface (a surface facing the −Z-axis direction) of the liquid crystal panel 20 to emit light to the liquid crystal panel 20. The backlight unit 10 may include a light source 11, a light guide plate 12, a reflector 13, an optical film 100, and a diffusion sheet 17. The backlight unit 10 may further include a reflective polarizing sheet although not shown in the drawing.

The light source 11 may be configured to emit light on the back of the liquid crystal panel 20 and may be placed on one side of the light guide plate (LGP) 12. The light source can be classified as an edge-type or a direct-type depending on the structure configuration and in the present disclosure, as shown in FIG. 1, an edge-type light source can be utilized. The light source 11 may be configured to emit light to the back of the liquid crystal panel 20 and the light emitted from the light source 11 can be converted into a surface light source by the light guide plate 12. At this time, the light source 11 may be a cold cathode fluorescent lamp (CCFL) or an external electrode fluorescent lamp (EEFL). The reflector 13 may be disposed behind the light guide plate 12 thereby reflecting the light emitted toward the rear of the light guide plate 12 (a surface facing the −Z-axis direction) to the light guide plate 12 and then, making it incident. As a result, the loss of light can be minimized. In other words, the reflector 13 can perform light recycling.

Referring to FIG. 1, the light emitted from the light guide plate 12 is incident to the optical film 100. The optical film 100 of the present disclosure may include at least one prism sheet for concentrating light and it may further include a sheet including a pyramid pattern as a sheet for uniformly dispersing the incident light from the light guide plate 12 and then making it incident to the prism sheet. For convenience of explanation, one prism sheet or a combination of two or more prism sheets for concentrating light included in the optical film 100 can be referred to as a 'concentrating prism sheet' (or 'cross prism sheet') and a sheet containing the pyramid pattern can be referred to as a 'pyramid sheet' in the following description.

As will be described in detail below, the optical film 100 of the present disclosure may include a first sheet 110 where a pyramid pattern is formed on one surface facing a direction parallel to the direction of travel of the light emitted from the light source (e.g., Z-axis direction) and a prism pattern (i.e., a reversed prism pattern) is formed on the other surface facing a direction opposite to the direction of travel of the light emitted from the light source as a pyramid sheet. In addition, the optical film 100 of the present disclosure may include a second sheet 120 where a prism pattern is formed on one surface facing a direction parallel to the direction of travel of the light emitted from the light source (e.g., Z-axis direction) as a concentrating prism sheet. According to one embodiment, a diffusion layer may be formed on the other surface of the second sheet 120 facing a direction opposite to the direction of travel of the light emitted from the light source. According to one embodiment, the optical film 100 of the present disclosure may further include a third sheet 130 having a prism pattern where a direction of an edge of the prism pattern is different to a direction of an edge of the prism pattern formed on the second sheet 120 as a concentrating prism sheet other than the second sheet 120. According to one embodiment, a diffusion layer may be formed on the other surface of the third sheet 130 facing a direction opposite to the direction of travel of the light emitted from the light source.

The concentrating prism sheet (the second sheet 120 and/or the third sheet 130) can collect incident light using an optical pattern formed on its surface and then emit it to the liquid crystal panel 20. The concentrating prism sheet (the second sheet 120 and/or the third sheet 130) may include a transparent base film and a prism pattern layer formed on an upper surface (a surface facing the +Z-axis direction) of the base film. The prism pattern layer may be formed as an optical pattern layer in the form of a triangular array with a lateral face at a specified inclination angle (for example, a lateral face with 45° inclination) to improve brightness in the plane direction. The prism patterns of the prism pattern layer may be in the shape of a triangular pillar and may be arranged so that one surface of the triangular pillar faces the base film. The cross-section of each of the prism patterns may be triangular.

According to one embodiment, the concentrating prism sheet (the second sheet 120 and/or the third sheet 130) may include the second sheet 120 and the third sheet 130 to form a composite prism sheet structure. Here, the third sheet 130 may be arranged to overlap the second sheet 120. In the second sheet 120, a plurality of second prism patterns may be arranged side by side with each other. Each second prism pattern may have a structure extending in one direction. For example, the vertex lines (referred to as 'edges') of each of the second prism patterns may be formed to extend toward the X-axis direction. Similarly, in the third sheet 130, a plurality of third prism patterns may also be arranged side by side with each other. Each of the third prism patterns may have a structure extending in one direction. For example, the edges of each of the third prism patterns may be formed to extend toward the Y-axis direction which is perpendicular to the X-axis direction. Here, the extension direction of the first prism patterns and the extension direction of the second prism patterns are shown as facing the X-axis direction and Y-axis direction for convenience of explanation. However, it should be noted that it is not limited to the illustrated embodiment and may be oriented in a direction other than the X-axis direction or Y-axis direction.

According to one embodiment, a prism pattern (a plurality of first prism patterns) may also be formed on the pyramid sheet (the first sheet 110). The plurality of first prism patterns included in the first sheet 110 may be formed to be protruded to a reversed direction (−Z-axis direction) of the direction of travel of light (+Z-axis direction) unlike the plurality of second prism patterns included in the second sheet 120 and the plurality of third prism patterns included in the third sheet 130 where they are protruded to a direction parallel to the direction of travel of light. Accordingly, the plurality of first prism patterns included in the first sheet 110 may be referred to as 'reversed prism patterns.' The edge direction P1 of the plurality of first prism patterns (referred to as a 'first prism direction') may be formed the same as or different from the edge direction P2 of the plurality of second prism patterns (referred to as a 'second prism direction') and the edge direction P3 of the plurality of third prism patterns (referred to as a 'third prism direction').

According to one embodiment, as shown in FIG. 1, the edge direction P1 of the plurality of first prism patterns may be perpendicular to the edge direction P2 of the plurality of second prism patterns and may be parallel to the edge direction P3 of the plurality of third prisms. The liquid crystal display (LCD) device 1 of the present disclosure may have associating effects. A more detailed explanation regarding the edge direction of the prism patterns will be described later.

The diffusion sheet 17 can uniformly disperse light incident from the optical film 100. The diffusion sheet 17 where curable resin solution (e.g., urethane acrylate, epoxy acrylate, ester acrylate, or at least one selected from or mixed of ester acrylate and radical generating monomer) added with light diffusion beads is deposited can induce light diffusion by the light diffusion beads. In addition, the diffusion sheet 17 may be formed a protrusion pattern (or a protrusion portion) having uniform or non-uniform size of shape (e.g., spherical, hemispherical, or elliptical) to promote the diffusion of light. According to some conventional embodiments, the diffusion sheet 17 may further include the upper diffusion sheet 17 disposed over the concentrating prism sheet disclosed in FIG. 1 as well as the lower diffusion sheet disposed below the concentrating prism sheet. However, in the present specification, the lower diffusion sheet can be replaced by providing an optical film 100 where the concentrating prism sheet and the pyramid sheet are combined.

According to the embodiment, at least one of the above-described components (e.g., the diffusion sheet 17) may be omitted from or one or more other components (e.g., a reflective polarizing sheet (not shown)) may be added to the backlight unit 10.

Because the reflective polarizing sheet (not shown) may be provided on the top of the optical film 100 and the diffusion sheet 17, it may play a role to transmit some polarized light of light concentrated from the optical film 100 and diffused by the upper diffusion sheet 17 and to reflect other polarized light to the lower part.

The liquid crystal panel 20 can refract light emitted from the light source 11 into a predetermined pattern according to an electrical signal. The refracted light may pass through a color filter and a polarizing filter disposed on the front of the liquid crystal panel 20 to construct an image.

Components included in the liquid crystal display (LCD) device 1 of FIG. 1 may be assembled with other components in an overlapped and stacked fashion in a height direction (+Z-axis direction). For example, in the liquid crystal display (LCD) device 1 according to a certain embodiment as shown in FIG. 1, the individually manufactured backlight unit 10 and the liquid crystal panel 20 may be overlapped and stacked in the height direction (+Z-axis direction).

Figure 2:
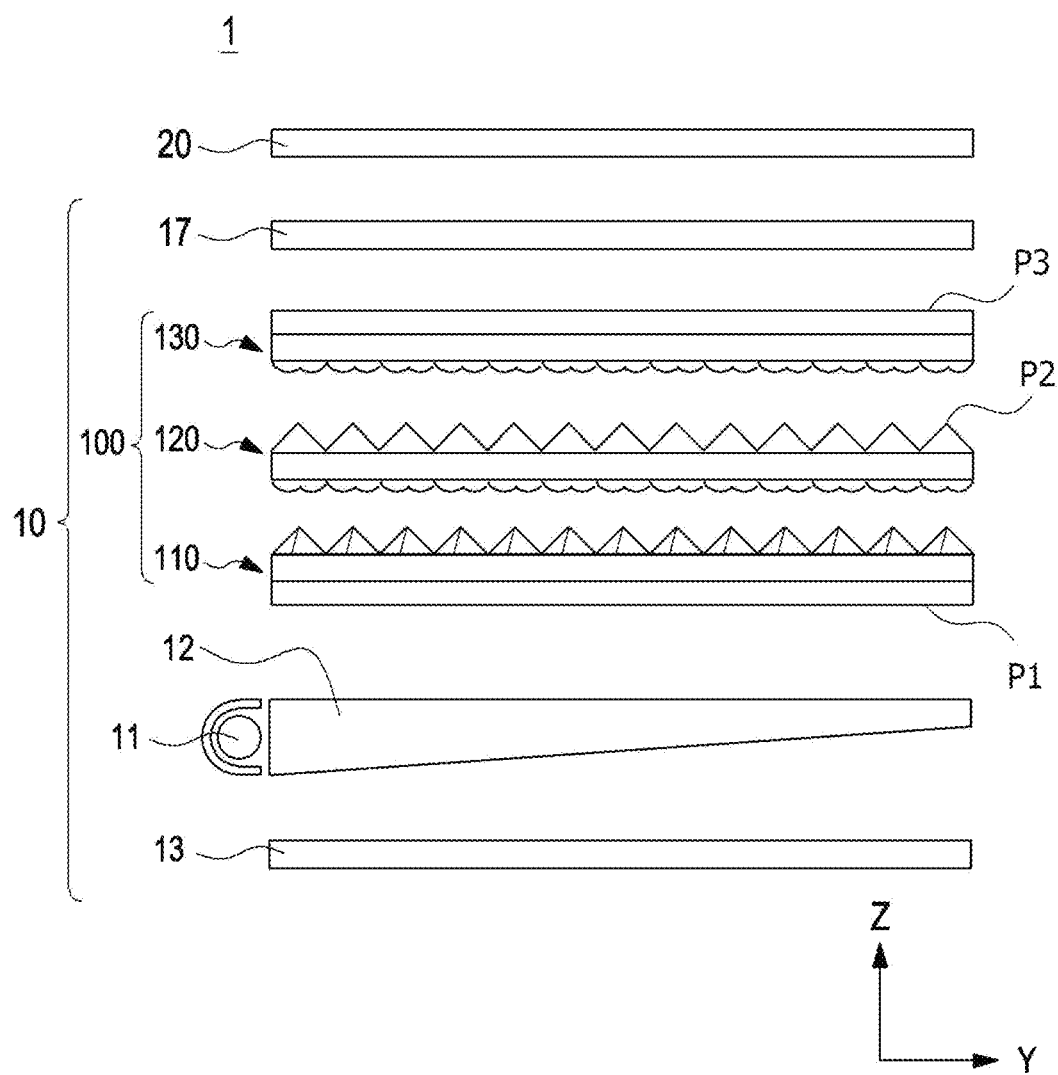
FIG. 2 is a drawing illustrating a liquid crystal display (LCD) device including an optical film according to an embodiment.
Figure 3:
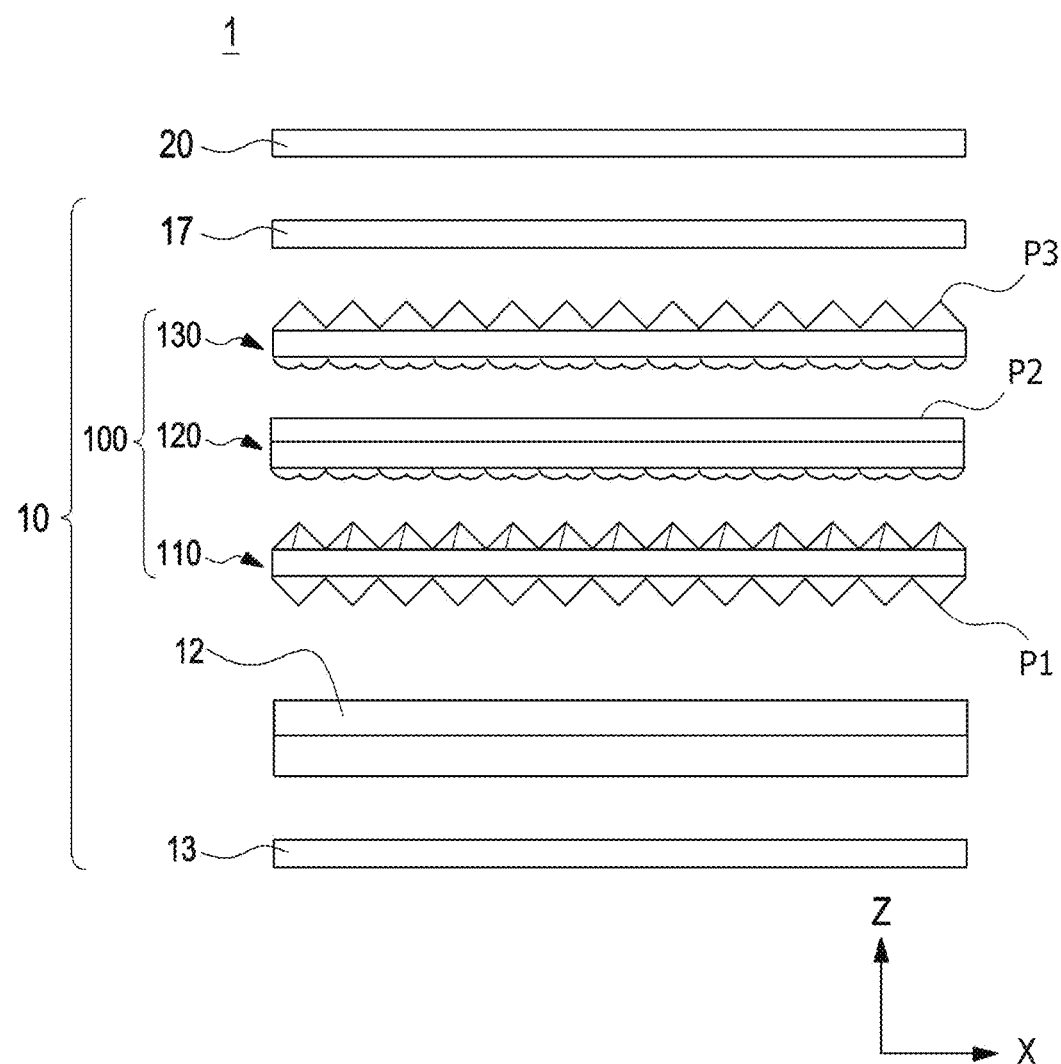
FIG. 3 is a drawing illustrating a liquid crystal display (LCD) device including an optical film according to an embodiment.

FIG. 2 is a drawing illustrating a liquid crystal display (LCD) device including an optical film according to an embodiment. FIG. 3 is a drawing illustrating a liquid crystal display (LCD) device including an optical film according to an embodiment.

FIG. 2 may represent a cross-section parallel to a plane formed by the Y and Z axes of the liquid crystal display (LCD) device 1 and FIG. 3 may represent a cross section parallel to a plane formed by the X and Z axes of the liquid crystal display (LCD) device 1. Below, overlapping description with FIG. 1 will be omitted.

The liquid crystal display (LCD) device 1 of the present disclosure may be characterized as replacing the diffusion sheet only with the optical film 100 of the present disclosure without a separate diffusion sheet (e.g., the lower diffusion sheet) between the optical film 100 and the light guide plate 12.

In the present disclosure, the 'optical film 100' may refer to a film including a first sheet 110 with a plurality of pyramid patterns formed on one surface, a second sheet 120 disposed on the first sheet 110 with a plurality of prism patterns formed on one surface, and a third sheet 130 disposed on the second sheet 120 with a plurality of prism patterns formed on one surface as shown in FIGS. 1 to 3. In FIGS. 1 to 3, for convenience of explanation, the first sheet 110, the second sheet 120, and the third sheet 130 are shown as spaced apart from each other. However, unlike this, the first sheet 110, the second sheet 120, and the third sheet 130 may be formed by being laminated with each other (via lamination). In the present specification, 'lamination' may mean that two different sheets are adhered by an included pattern formed of adhesive resin on at least one surface of the facing surfaces of the two different sheets. For example, there is a pattern formed of semi-cured adhesive resin on one of the two opposing surfaces of two different sheets and the other surface may be in contact with this pattern, and then completely cured and adhered. In addition, for example, two opposing surfaces of two different sheets may be formed of adhesive resin in a semi-cured state and may be fully cured and adhered after contacting each other. The laminated optical film 100 can be provided to a backlight unit that is thinner and has excellent shielding performance compared to an embodiment where the film is simply stacked rather than laminated.

The plurality of pyramid (or quadrangular pyramid) patterns of the first sheet 110 may refract and/or reflect light transmitted from the light source 11 and then transmit it to the second sheet 120. The second sheet 120 may be formed with a plurality of prisms (or triangular pillars) extending in the lateral direction (X-axis direction) of the liquid crystal display (LCD) device 1 and protruding in the height direction (Z-axis direction). The second sheet 120 may transmit light passing through the first sheet 110 to the third sheet 130. The third sheet 130 may be formed with a plurality of prisms (or triangular pillars) extending in the longitudinal direction (Y-axis direction) of the liquid crystal display (LCD) device 1 and protruding in the height direction (Z-axis direction). The third sheet 130 can transmit light passing through the second sheet 120 toward the liquid crystal panel 20. Because the light incident to the optical film 100 from the light source 11 may be diffused and/or concentrated while sequentially passing through the first sheet 110, the second sheet 120, and the third sheet 130 to form the light source 11, it is possible to have the advantage of not only securing shielding performance for covering the shape of the light source 11, but also securing high brightness performance. According to an embodiment in FIGS. 1 to 3, the plurality of prism patterns of the second sheet 120 is shown to be extended in the lateral direction (X-axis direction) of the liquid crystal display (LCD) device 1 and the plurality of prism patterns of the third sheet 130 is shown to be extended in the longitudinal direction (Y-axis direction) of the liquid crystal display (LCD) device 1 but are not necessarily limited to. In contrast, the plurality of prism patterns of the second sheet 120 may be extended in the longitudinal direction (Y-axis direction) of the liquid crystal display (LCD) device 1 and the plurality of prism patterns of the third sheet 130 may be extend in the lateral direction (X-axis direction) of the liquid crystal display (LCD) device 1. However, it may be sufficient for the plurality of prism patterns of the second sheet 120 and the plurality of prism patterns of the third sheet 130 to be orthogonal to each other.

Referring to FIG. 1 again, the pyramid pattern layer 111 of the first sheet 110 may include a pyramid pattern (referred to as the pyramid pattern 111a of FIG. 4A) having a length of a first side of a pyramid base of 'a' in a first pyramid direction, a length of a second side of the pyramid base of 'b' in a second pyramid direction, a height of 'h', and four side surfaces 111-1, 111-2, 111-3, 111-4 having vertex angles of A and B. The dimensions of the pyramid pattern may be set differently depending on the embodiment. When the pyramid base of the pyramid pattern 111a is viewed from above (e.g., looking in a direction opposite to the Z-axis direction), the pyramid base may have a rectangular shape having the length of the first side of the pyramid base of a in the first pyramid direction and the length of the second side of the pyramid base of b in the second pyramid direction. In this case, a diagonal length of the pyramid base is c. According to an embodiment, the pyramid base of the pyramid pattern 111a may be square. In this case, the length of a in the pyramid first direction and the length of b in the pyramid second direction are the same (a=b), and the diagonal length of the pyramid base c may have the value of √2a. However, in the present specification, the fact that the pyramid base of the pyramid pattern 111a is square may include the case where the length of a in the first pyramid direction is the same as the length of b in the second pyramid direction (a=b) but is not limited to. It should be noted that cases where the length of a in the first pyramid direction and the length of b in the second pyramid direction are different within a certain margin of error (e.g., 15% margin of error) (a≠b) may also be included.

Figure 4A:
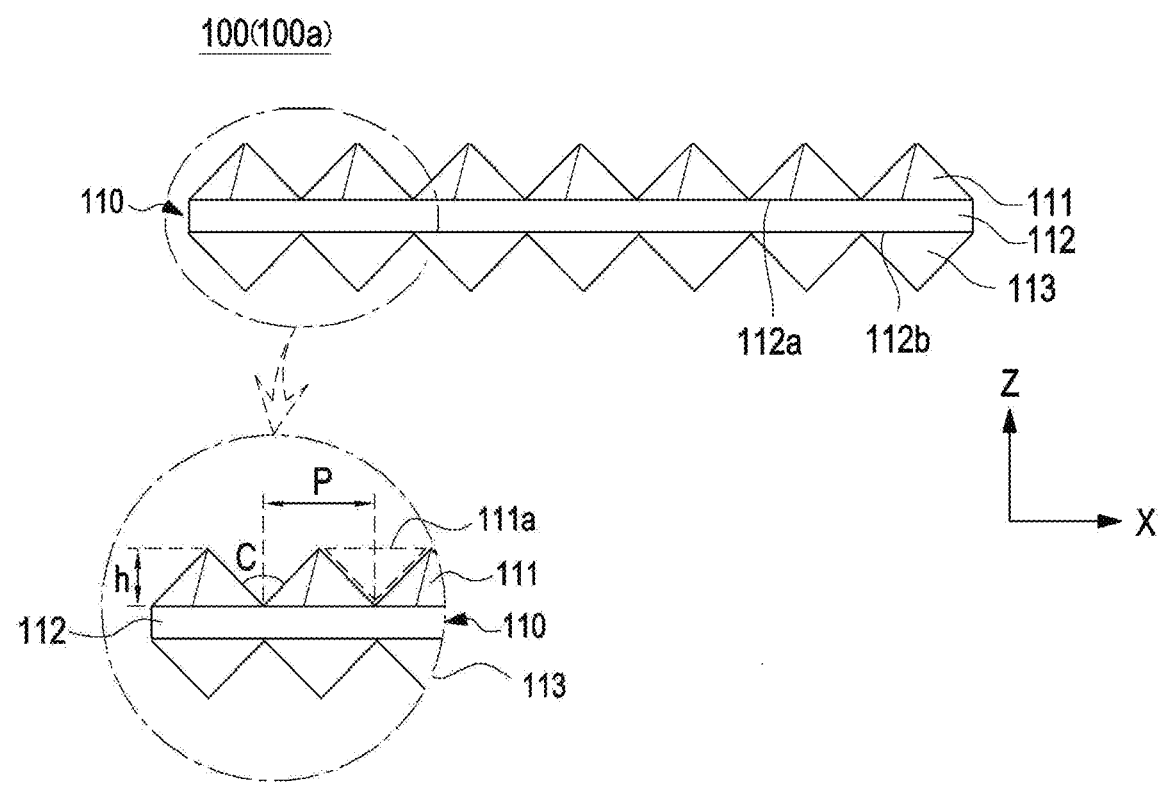
FIG. 4A is a cross-sectional view showing an optical film according to an embodiment.
Figure 4B:
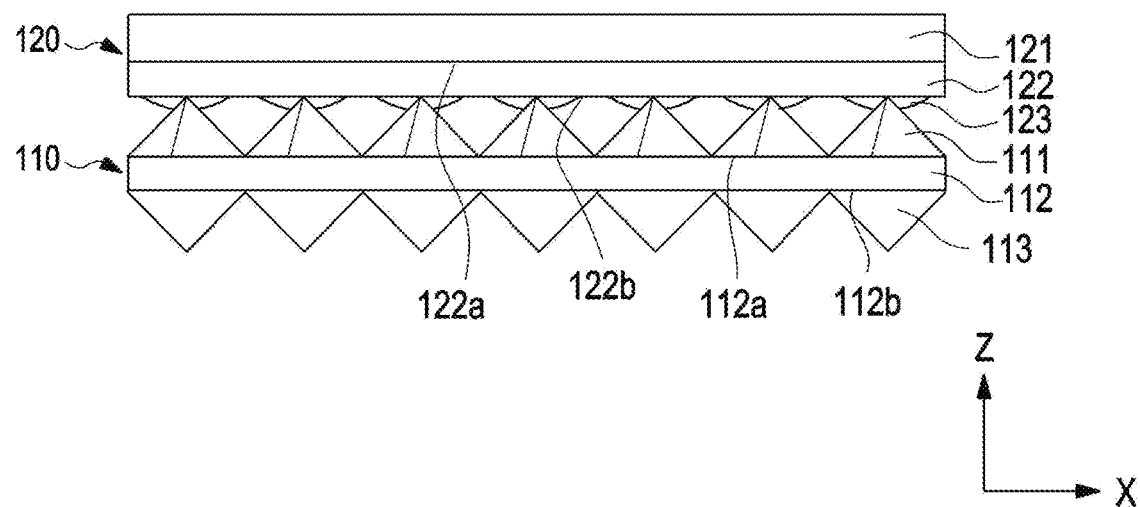
FIG. 4B is a cross-sectional view showing an optical film according to an embodiment.
Figure 4C:
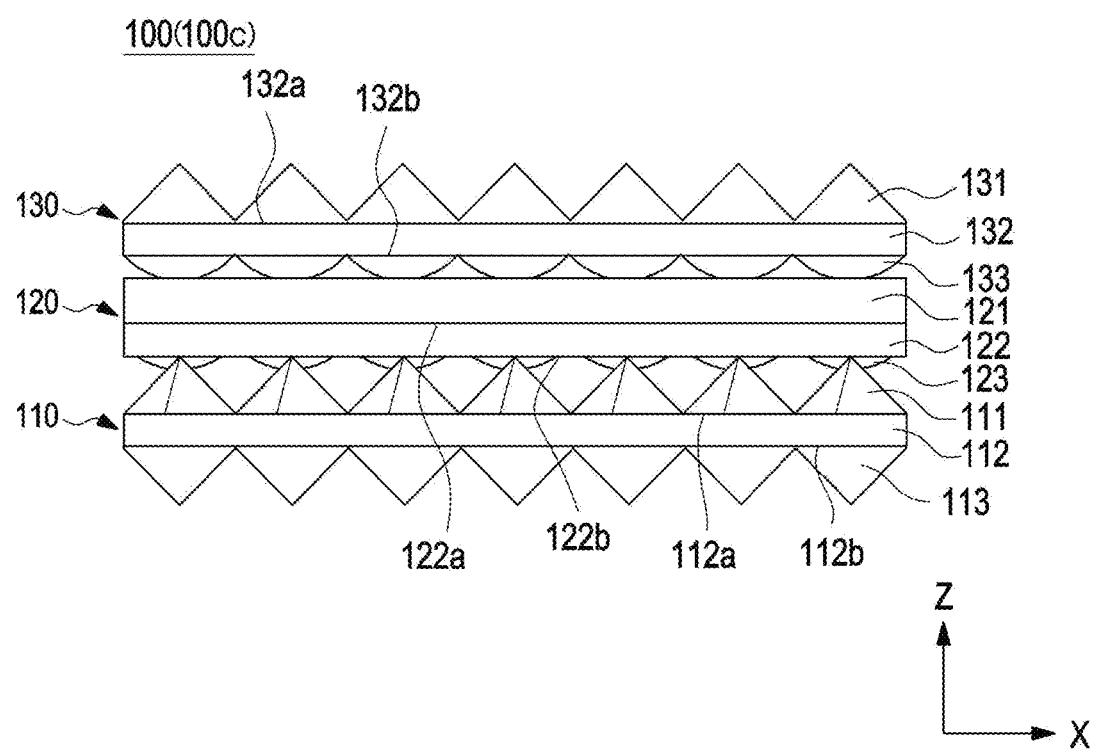
FIG. 4C is a cross-sectional view showing an optical film according to an embodiment.
Figure 4D:
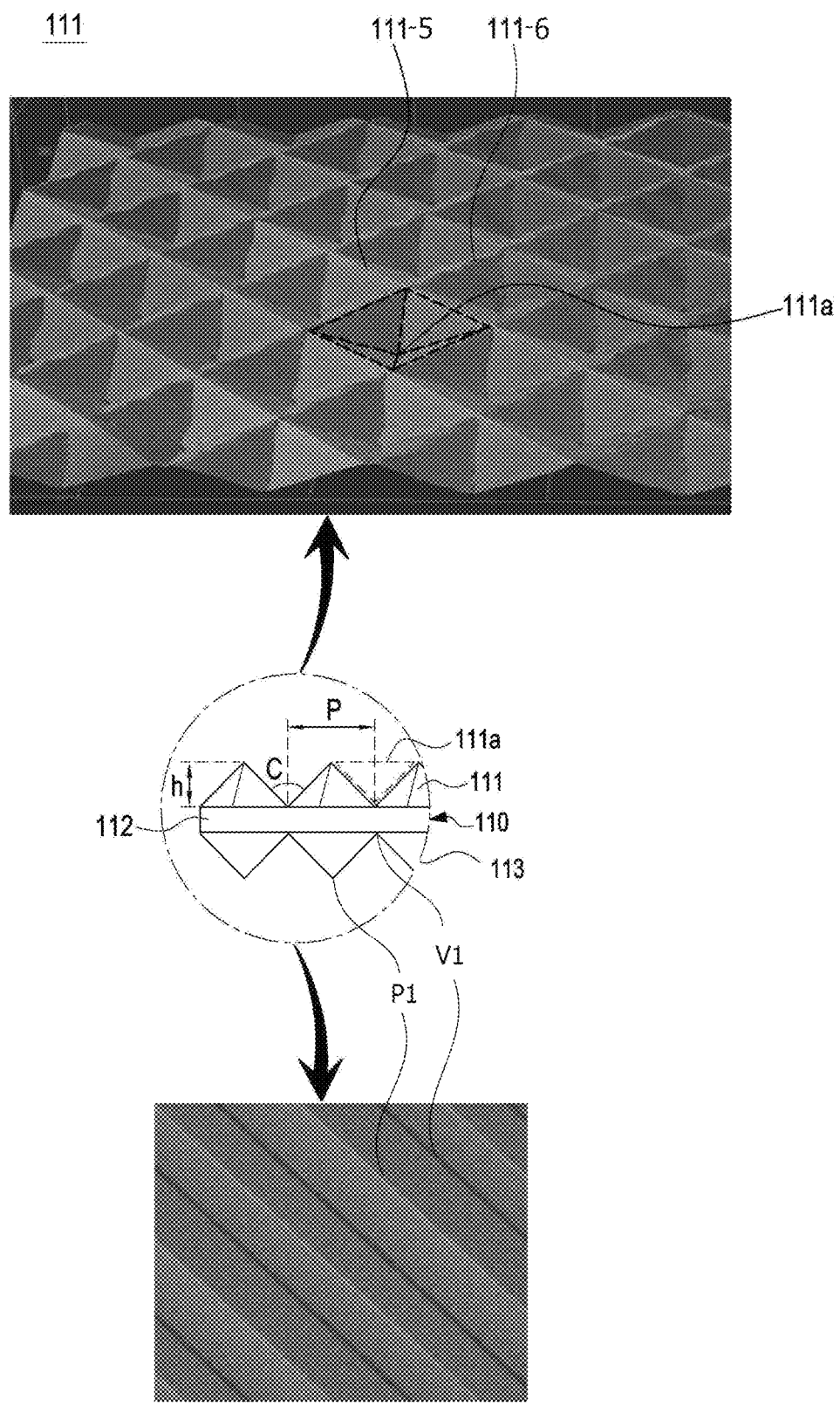
FIG. 4D is an image and a cross-sectional view showing a pyramid pattern and a prism pattern according to an embodiment.
Figure 4E:
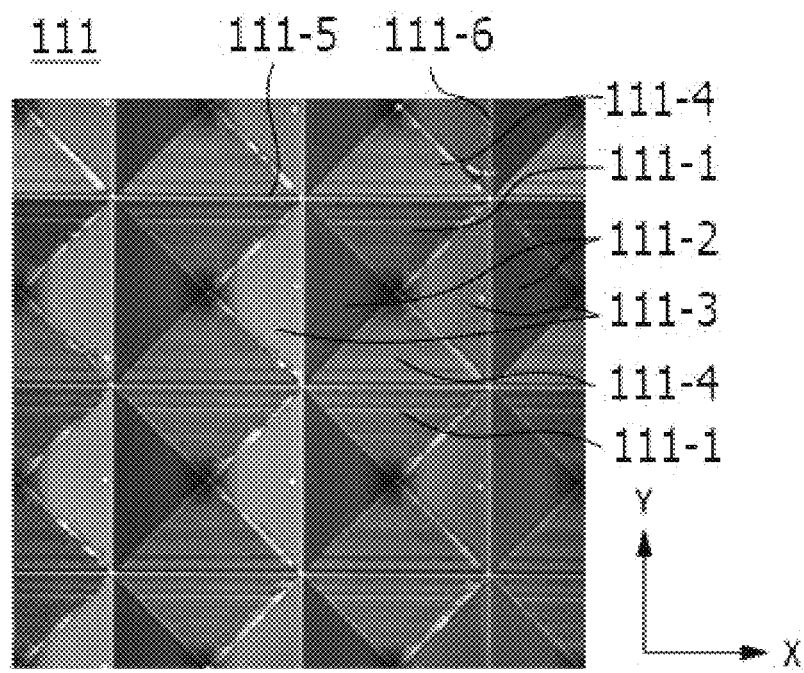
FIG. 4E is an image illustrating a top view of the pyramid pattern layer before lamination according to an embodiment.
Figure 4F:
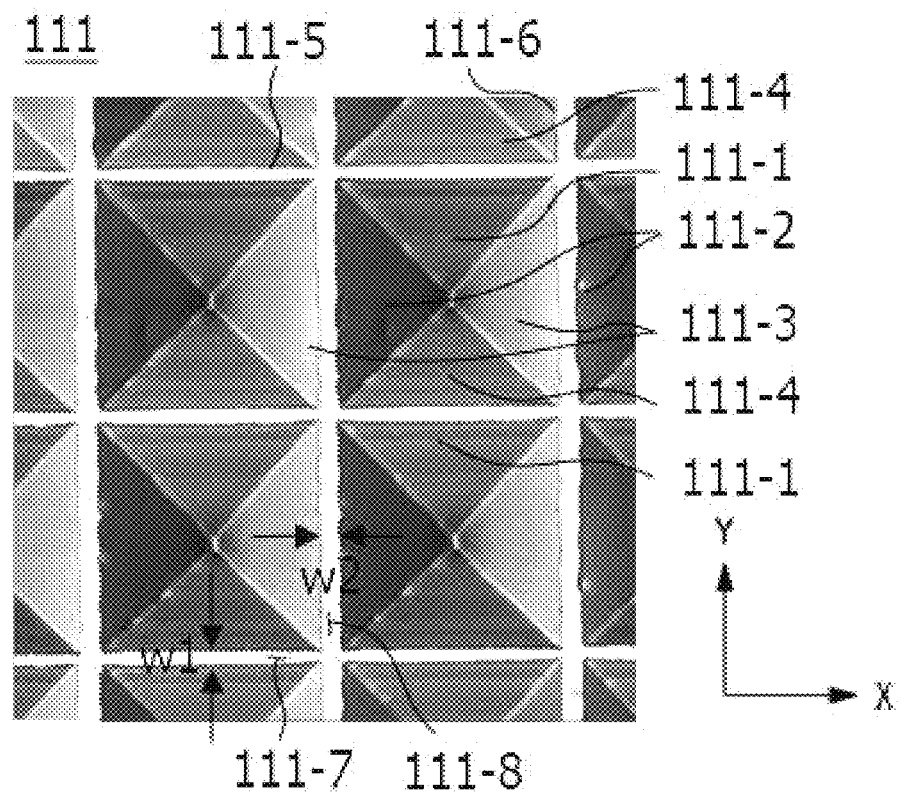
FIG. 4F is an image illustrating a top view of the pyramid pattern layer after lamination according to an embodiment.

Below, the optical film 100 will be described in more detail with reference to FIGS. 4A to 4F. FIG. 4A is a cross-sectional view showing an optical film according to an embodiment. FIG. 4B is a cross-sectional view showing an optical film according to an embodiment. FIG. 4C is a cross-sectional view showing an optical film according to an embodiment. FIG. 4D is an image and a cross-sectional view showing a pyramid pattern and a prism pattern according to an embodiment. FIG. 4E is an image illustrating a top view of the pyramid pattern layer before lamination according to an embodiment. FIG. 4F is an image illustrating a top view of the pyramid pattern layer after lamination according to an embodiment.

Referring to FIGS. 4A to 4C, the optical film 100 according to an embodiment of the present disclosure may include an optical film 100a including a first sheet 110, an optical film 100b including the first sheet 110, and a second sheet 120, and an optical film 100c including the first sheet 110, the second sheet 120 and a third sheet 130. For example, the first sheet 110 may be used alone as a component of the optical film 100a without using other sheets (e.g., the second sheet 120 and the third sheet 130). According to the present disclosure, the second sheet 120 and/or the third sheet 130 may further include the first sheet 110 thereby providing an optical film with excellent shielding performance against a light source and excellent brightness performance. Below, unless otherwise specified, each component included in the optical film 100 may be described in detail using the optical film 100c of FIG. 4C as an example for convenience. According to an embodiment, the optical film of three sheets 110, 120, 130 (e.g., the optical film 100c of FIG. 4C) as well as the optical film of one sheet 110 (e.g., the optical film 100a of FIG. 4A) and the optical film of two sheets 110, 120 (e.g., the optical film 100b of FIG. 4B) may also be included within the scope of the present disclosure.

Referring to FIG. 4C, the optical film 100 (e.g., optical film 100c) may include the first sheet 110, the second sheet 120, and the third sheet 130, respectively, and they may also respectively include a first base portion 112, a second base portion 122, and a third base portion 132. At this time, the first base portion 112, the second base portion 122, and the third base portion 132 may be made of transparent material capable of transmitting light including, for example, polycarbonate series, polysulfone series, polyacrylate series, polystyrene series, polyvinyl chloride series, polyvinyl alcohol series, polynorbornene series, and polyester series material. For a specific example, the first base portion 112, the second base portion 122, and/or the third base portion 132 may be made of polyethylene terephthalate (PET) or polyethylene naphthalate, etc. The first base portion 112, the second base portion 122, and the third base portion 132 may be, for example, PET with a thickness of about 10 μm to about 50 μm, and more specifically, they may be PET having a thickness of about 24 μm to about 40 μm. In various experimental examples, including the viewing angle distribution described later with reference to FIG. 6A and subsequent drawings, the first base portion 112, the second base portion 122, and the third base portion 132 each made of PET with a thickness of 24 μm can be used as examples. However, it should be noted that the thicknesses of the first base portion 112, the second base portion 122, and the third base portion 132 are not limited to the above examples.

As previously discussed in the embodiment of FIG. 1, the first sheet 110 may include a pyramid pattern 111a with a first pyramid directional length of 'a', a second pyramid directional length of 'b', a height of 'h', a pitch of 'P', and four side surfaces 111-1, 111-2, 111-3, 111-4 forming the vertex angles of A and B corresponding to a quadrangular pyramid shape formed on the first surface 112a of the first base portion 112. The optical film 100 may include a plurality of pyramid patterns 111a having a plurality of columns in the first pyramid direction and a plurality of rows in the second pyramid direction perpendicular to the first pyramid direction.

Referring to FIGS. 4A and 4D together, according to an embodiment, the pyramid pattern 111a may be an intaglio pattern. The pyramid pattern 111a may mean an intaglio pattern where quadrangular pyramid shaped grooves are formed regularly and it may be defined by the four side surfaces 111-1, 111-2, 111-3, 111-4. Here, the four sides may have the same or different triangular shapes, and the dimensions of the vertex angles of A and B may be set according to the lateral length of 'a', the longitudinal length of 'b', and the height of each cross-section of the pyramid pattern 111a. According to an embodiment, the vertex angles A and B may be formed as substantially the same angle, and accordingly, the lateral length of 'a' and the longitudinal length of 'b' of the pyramid pattern 111a may also be set to be substantially the same. Here, the fact that the vertex angles A and B are substantially the same may mean that the vertex angle A and the vertex angle B have the same value within a process deviation (e.g., about 10%).

Additionally, the height of 'h' and the pitch of 'P' may be set with respect to the vertex angle of C of the pyramid pattern 111a. The optical film 100 may include the pyramid pattern 111a whose vertical cross-section parallel to the height direction (Z-axis direction) is triangular or trapezoid and the vertex angle of C may be defined as an angle formed between two facing sides of the four sides of the pyramid pattern 111a.

According to an embodiment, the vertex angle of C of the pyramid pattern 111a may be defined as 60° or more and 160° or less. For example, the vertex angle of C may be 90°. As the vertex angle of C of the pyramid pattern 111a is increased within a specified angle range, the angle θ (theta) of light incident to the second sheet 120 (referred to as 'incident angle θ') may be increased. For example, in case of the optical film (e.g., the optical film 100c) including three sheets of the present disclosure, the first sheet 110 including the pyramid pattern 111a may play a role in ensuring that light incident to the second sheet 120 and the third sheet 130 can be incident at an optimal angle in a way to improve brightness. The relationship between the components of the optical film and the brightness will be described in more detail later with reference to embodiments in FIG. 5 and subsequent drawings.

According to an embodiment, the pyramid pattern 111a may also be formed as an embossed pattern. FIG. 4E shows the pyramid pattern layer before the first sheet 110 is laminated to the second sheet 120 and FIG. 4F shows the pyramid pattern where the first sheet 110 is peeled from the second sheet 120 after the first sheet 110 and the second sheet 120 was laminated. Referring to FIG. 4E, the pyramid pattern layer 111 before lamination may include a first barrier rib 111-5 formed between the first side surface 111-1 and the fourth side surface 111-4 for defining a boundary between the first side surface 111-1 and the fourth side surface 111-4 and a second barrier rib 111-6 formed between the second side surface 111-2 and the third side surface 111-3 for defining a boundary between the second side surface 111-2 and the third side surface 111-3. The barrier rib 111-5 and the second barrier rib 111-6 may be the uppermost part of the first sheet 110. According to an embodiment, the first barrier rib 111-5 may be formed to be parallel to the first pyramid direction and the second barrier rib 111-6 may be formed to be parallel to the second pyramid direction, but noted that it is not necessarily limited. Referring to FIG. 4F, if the pyramid pattern layer 111 disposed on the upper surface of the first sheet 110 is laminated to the rear surface of the second sheet 120 (e.g., the rear surface of the second base portion 121 of the second sheet 120 or the first diffusion layer 123 of the second sheet 120), tips of the first barrier rib 111-5 and the second barrier rib 111-6, which are the uppermost part of the pyramid pattern layer 111, may be pressed. Accordingly, the tip of the first barrier rib 111-5 may be deformed to form a first flat portion 111-7 with a predetermined width W1 and the tip of the second barrier rib 111-6 may be deformed to form a second flat portion 111-8 with predetermined width W2. According to an embodiment, the width W1 of the first flat portion 111-7 and the width W2 of the second flat portion 111-8 may be substantially the same.

Figure 6A:
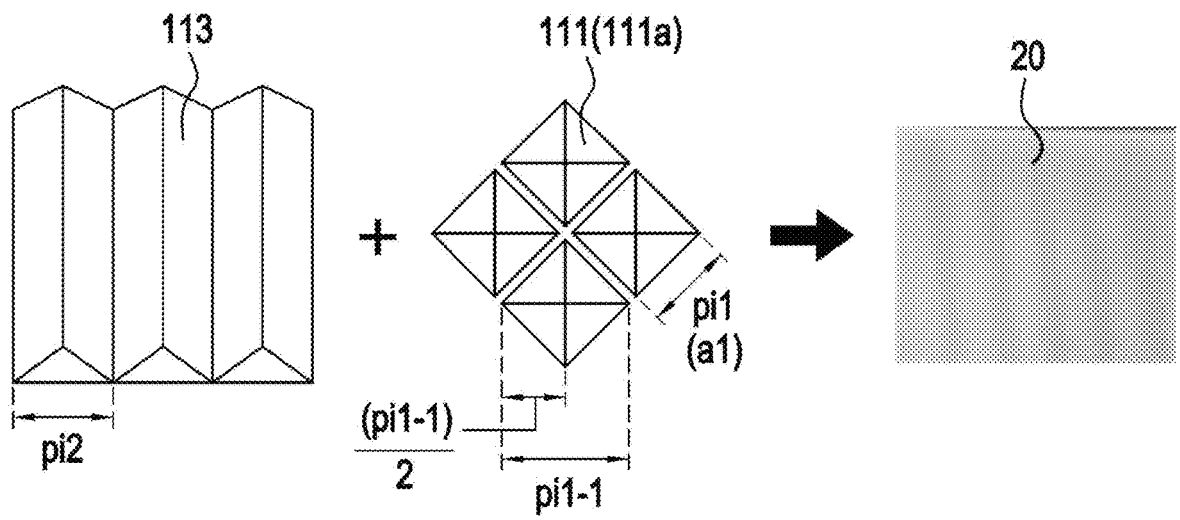
FIG. 6A is a liquid crystal panel image and drawings of a reversed prism pattern (a first prism pattern layer) and a pyramid pattern showing an outcome from an arrangement of the reversed prism pattern and the pyramid pattern according to a certain embodiment.

According to various embodiments of the present disclosure, it is possible to control lights in four quadrant directions in a peripheral area by including the pyramid pattern layer 111. According to an embodiment of the present disclosure, the pyramid pattern layer 111 may include a pyramid pattern 111a whose vertex angle, which is the angle between two facing triangles, may be greater than or equal to 90° and less than or equal to 130°. According to an embodiment, if the vertex angle of the pyramid pattern 111a is formed at an angle of at least 90°, the shielding performance can be satisfied as shown in FIG. 6A and if the vertex angle is less than 90°, hot spot visibility (HSV) where the light source 11a is visible may be increased.

The pyramid pattern layer 111 may be composed of a plurality of pyramid patterns and may be regularly arranged on the first surface 112a of the first sheet 110. A first prism pattern layer 113 including a plurality of first prism patterns may be formed on the second surface 112b of the first base portion 112. Except for the direction where the first prism pattern layer 113 is arranged with the second prism pattern layer 121 provided on the second sheet 120 and the third prism pattern layer 131 provided on the third sheet 130, it may have substantially the same configuration with others.

A plurality of second prism patterns extended along the lateral direction (or longitudinal direction) of the liquid crystal display (LCD) device 1. It may include a second prism pattern layer 121. The cross-section of the second prism pattern layer 121 may be triangular. For example, the plurality of second prism patterns included in the second prism pattern layer 121 may have a pitch of pi3 and a height of h3. The third sheet 130 may be formed on the first surface 132a of the third base portion 132 with a plurality of third prism patterns extended in parallel in the longitudinal direction (or lateral direction) of the liquid crystal display (LCD) device 1. It may include a third prism pattern layer 131. The cross-section of the prism pattern formed in the third prism pattern layer 131 may be triangular. For example, the plurality of third prism patterns formed in the third prism pattern layer 131 may have a pitch of 'pi4' and a height of 'h4'. Here, the plurality of second prism patterns included in the second prism pattern layer 121 and the plurality of third prism patterns included in the third prism pattern layer 131 may be extended in directions orthogonal to each other, and the second and the third prism patterns may be formed to have the same pitch and height each other, but is not necessarily limited to and the configuration of the prism patterns may be varied depending on the embodiment.

According to the embodiment, a first diffusion layer 123 may be included on the second surface 122b of the second base portion 122 of the second sheet 120 and a second diffusion layer 133 may be included on the second surface 132b of the third base portion 132 of the third sheet 130. The first diffusion layer 123 and the second diffusion layer 133 may be treated to have a matte pattern to increase turbidity by creating a rough surface of the first diffusion layer 123 and the second diffusion layer 133, respectively, by using beads of glass and polymer, etc. It can be manufactured using any treatment method that increases turbidity including bead treatment to increase turbidity. For example, in various experimental examples including the viewing angle distribution described later in the drawings of FIG. 8B, the first diffusion layer 123 has a haze value of 3% and the second diffusion layer 133 has a haze value of 40%.

The first sheet 110 and the second sheet 120 may be laminated through the pyramid pattern layer 111 of the first sheet 110 and the second sheet 120 (or the first diffusion layer 123 of the second sheet 120). The second sheet 120 and the third sheet 130 may be laminated through the second prism pattern layer 121 of the second sheet 120 and the third sheet 130 (or the second diffusion layer 133 of the third sheet 130). At this time, each of the first diffusion layer 123 and the second diffusion layer 133 may be formed of, for example, an adhesive (e.g., adhesive resin) matte pattern. It can be manufactured by initially laminating a sheet with approximately 50% cured state which was not 100% cured (e.g., a semi-cured state) to another sheet and then, laminating the sheet to another sheet with being 100% cured state.

Figure 5A:
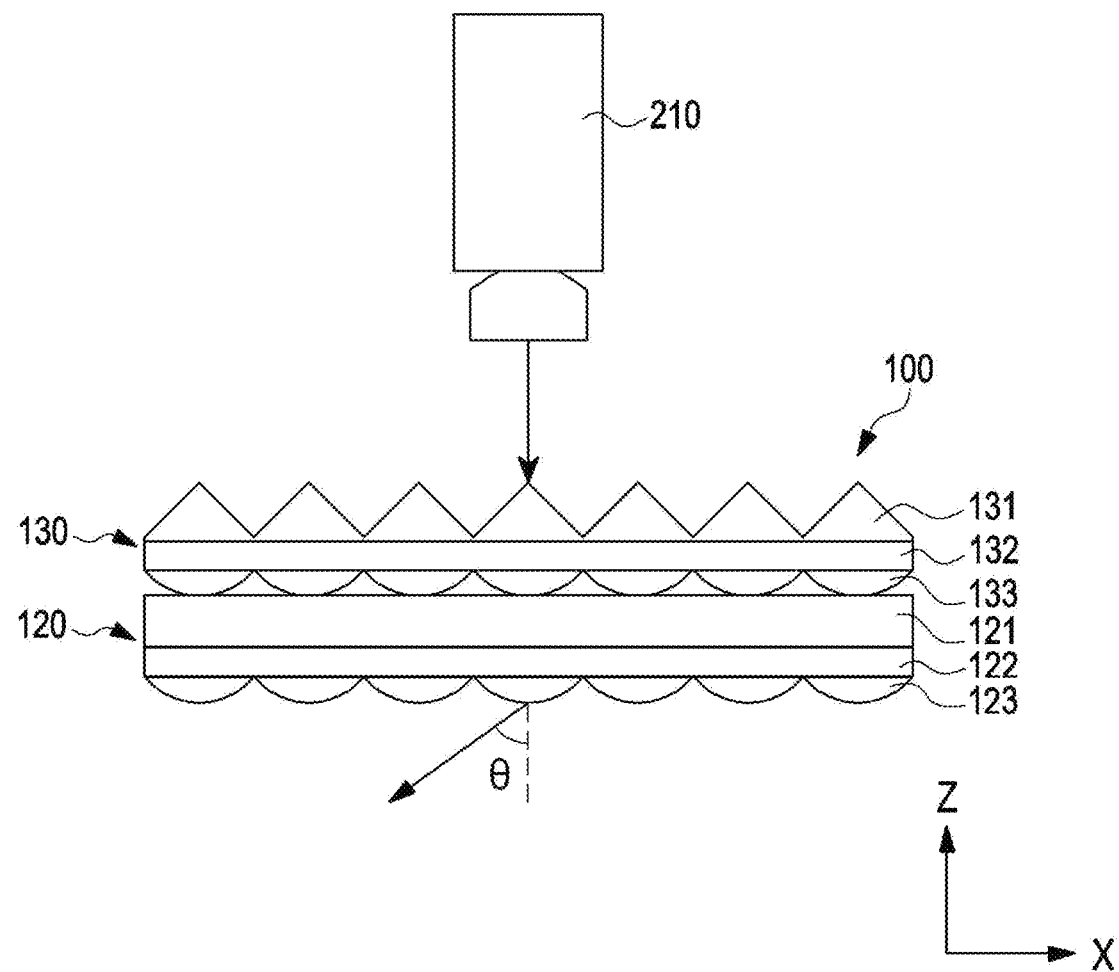
FIG. 5A shows the configuration for measuring the brightness of an optical film according to an embodiment.
Figure 5B:
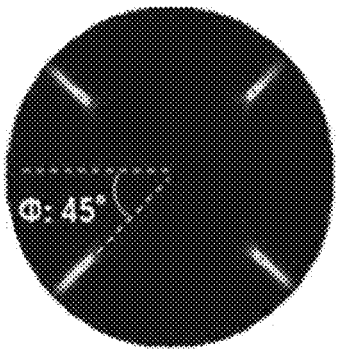
FIG. 5B is a table showing a viewing angle distribution and an optimal incident angle for increasing light distribution and brightness according to an embodiment.
Figure 5B:
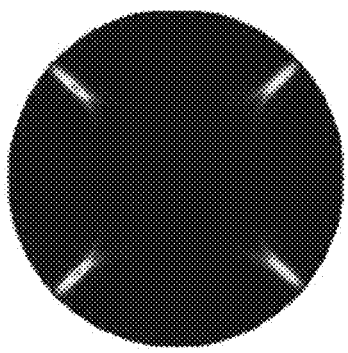

FIG. 5A shows the configuration for measuring the brightness of an optical film according to an embodiment. FIG. 5B is a table showing a viewing angle distribution and an optimal incident angle for increasing light distribution and brightness according to an embodiment. In FIG. 5B, the viewing angle distribution may represent the distribution of light focused on a horizontal plane (e.g., a plane parallel to the XY plane).

Referring to FIG. 5A, the configuration of an experiment for measuring the brightness may include an optical film 100 and an optical measurement device 210. Here, the optical film 100 may represent the second sheet 120 and the third sheet 130 laminated together and the first sheet 110 may be omitted. The optical measurement device 210 may be a high-speed spectroscopic measurement system such as a colorimetric luminance meter. Although not shown in the drawing, a backlight unit including a light source may be disposed on the opposite side of the optical measurement device 210 with respect to the optical film 100.

The optical measurement device 210 can measure light incident in a height direction (Z-axis direction) of the optical film 100 as shown in FIG. 5A. And the light distribution can be illustrated as shown in FIG. 5B by using a viewing angle distribution (BSDF, bidirectional scattering distribution function). At this time, to obtain high brightness for the liquid crystal display LCD) device 1, the brightness near '0° reference of the optical measurement device' which is parallel to the Z-axis direction where the optical measurement device 210 faces must be high in the viewing angle data measured by the optical measurement device 210. It was found through experimental results that the brightness around 0° became the highest when light passing through the second sheet 120 and the third sheet 130 in the optical film 100 was incident at a specific angle. In other words, the brightness of the liquid crystal display (LCD) device 1 can be the highest when light passing through the lower surface of the laminated one of the second sheet 120 and the third sheet 130 (e.g., the second surface 122b of the second sheet 120) is incident at a specific angle of incidence θ. Here, the incident angle θ may mean an angle formed by central light of the light (or light bundle) emitted from the first sheet 110 with respect to a normal line to the second surface 122b of the second sheet 120.

For example, referring to an embodiment (example 1-1) of FIG. 5B, in an embodiment where the second base portion 122 and the third base portion 132 have a thickness of 24 μm, respectively, if the pitch 'pi3' of the prism pattern of the second prism pattern layer 121 formed on the first surface 122a of the second base portion 122 is 50 μm and the height 'h3' is 25 μm; the first diffusion layer 123 formed on the second surface 122b of the second base portion 122 has a haze value of 3%; the pitch 'pi4' of the prism pattern of the third prism pattern layer 131 formed on the first surface 132a of the third base portion 132 is 50 μm and the height 'h4' is 25 μm; and the second diffusion layer 133 formed on the second surface 132b of the third base portion 132 has a haze value of 40%, the optimal angle of incidence θ where the brightness near 0° reference of the optical measurement device becomes the highest may be formed at 65°. In other words, when light passing through the lower surface of the laminated one of the second sheet 120 and the third sheet 130 (e.g., the second surface 122b of the second sheet 120) is incident at +65° (or −65°), the highest brightness can be achieved.

In addition, for example, referring to an embodiment (example 1-2) of FIG. 5B, in an embodiment where the second base portion 122 and the third base portion 132 have a thickness of 24 μm, respectively, if the pitch 'pi3' of the prism pattern of the second prism pattern layer 121 formed on the first surface 122a of the second base portion 122 is 45 μm and 55 μm and the height 'h3' is 22.5 μm and 22.7 μm; the first diffusion layer 123 formed on the second surface 122b of the second base portion 122 has a haze value of 15%; the pitch 'pi4' of the prism pattern of the third prism pattern layer 131 formed on the first surface 132a of the third base portion 132 is 50 μm and the height 'h4' is 25 μm; and the second diffusion layer 133 formed on the second surface 132b of the third base portion 132 has a haze value of 30%, the optimal angle of incidence θ where the brightness near 0° reference of the optical measurement device becomes the highest may be formed at 73°. In other words, when light passing through the lower surface of the laminated one of the second sheet 120 and the third sheet 130 (e.g., the second surface 122b of the second sheet 120) is incident at +73° (or −73°), the highest brightness can be achieved.

To summarize the above, the incident angle θ of light incident to the second sheet 120 may be determined by the configuration and/or the edge direction (e.g., P2 in FIG. 1) of the plurality of second prism patterns of the second prism pattern layer 121 included in the second sheet 120 and the configuration and/or the edge direction (e.g., P3 in FIG. 1) of the plurality of third prism patterns of the third prism pattern layer 131 included in the third sheet 130. In other words, the incidence angle θ can be set in various ways depending on the requirements of the second sheet 120 and/or the third sheet 130 required also for the optical film 100. Because the optical film 100 in the present disclosure may include the first prism pattern layer 113 including the prism pattern on the lower surface and the pyramid pattern layer 111 including the pyramid pattern on the upper surface based on the first base portion 112, it is possible to form an optical path corresponding to the optimal angle of incidence θ required for the optical film 100 according to a certain embodiment and as a result, the optical film 100 with high brightness can be provided. Meanwhile, referring to FIG. 5B, the viewing angle Φ is displayed, and it may mean an angle formed by an imaginary line extending from the center of the viewing angle distribution shown in FIG. 5B to one side (e.g., a direction parallel to the X-axis) and the central light of the emitted light (or light bundle) from the first sheet 110. The viewing angle (Φ, phi) is determined by the configuration and/or the edge direction (e.g., P1 in FIG. 1) of the plurality of first prism patterns of the first prism pattern layer 113 of the first sheet 110 where light is incident to the second sheet 120. The optimal viewing angle Φ in the two embodiments (example 1-1, example 1-2) shown in FIG. 5B is formed at 45°.

According to various embodiments of the present disclosure, it is possible to provide the optical film 100 including the first sheet 110 designed to increase the shielding performance in the direction where light is incident as well as for light passing through the lower surface of the laminated one of the second sheet 120 and the third sheet 130 (e.g., the second surface 122b of the second sheet 120) to be incident at a specific angle θ. Referring to FIGS. 1 to 5B, the optical film 100 according to one embodiment may comprise the first sheet 110 including the first base portion 112, the pyramid pattern layer 111 where a plurality of pyramid patterns is formed on the first surface 112a of the first base portion 112, and a first prism pattern layer 113 where a plurality of first prism patterns is formed on the second surface 112b of the first base portion 112; the second sheet 120 disposed overlapping the first sheet 110 including the second base portion 122, the second prism pattern layer 121 where a plurality of second prism patterns are formed on the first surface 122a of the second base portion 122, and the first diffusion layer 123 formed on the second surface 122b of the second base portion 122; and the third sheet 130 disposed overlapping the second sheet 120 including the third base portion 132, the third prism pattern layer 131 where a plurality of third prism patterns formed on the first surface 132a of the third base portion 132, and the second diffusion layer 133 formed on the second surface 132b of the third base portion 132.

In the liquid crystal display (LCD) device 1 of FIGS. 1 to 5B, the first sheet 110, the second sheet 120, and the third sheet 130 may be manufactured in a form where the first sheet 110, the second sheet 120, and the third sheet 130 are laminated together. Particularly considering the configurations of the laminated second sheet 120 and the third sheet 130, the first sheet 110 can refract and/or reflect light to enter at an angle θ from a point where the second surface 122b of the second sheet 120 meets to the second sheet 120 by properly adjusting the configurations of the pyramid pattern layer 111 formed on the first surface 112a of the first base portion 112 and the first prism pattern layer 113 formed on the second surface 112b of the first base portion 112 (improvement of brightness performance).

Figure 6B:
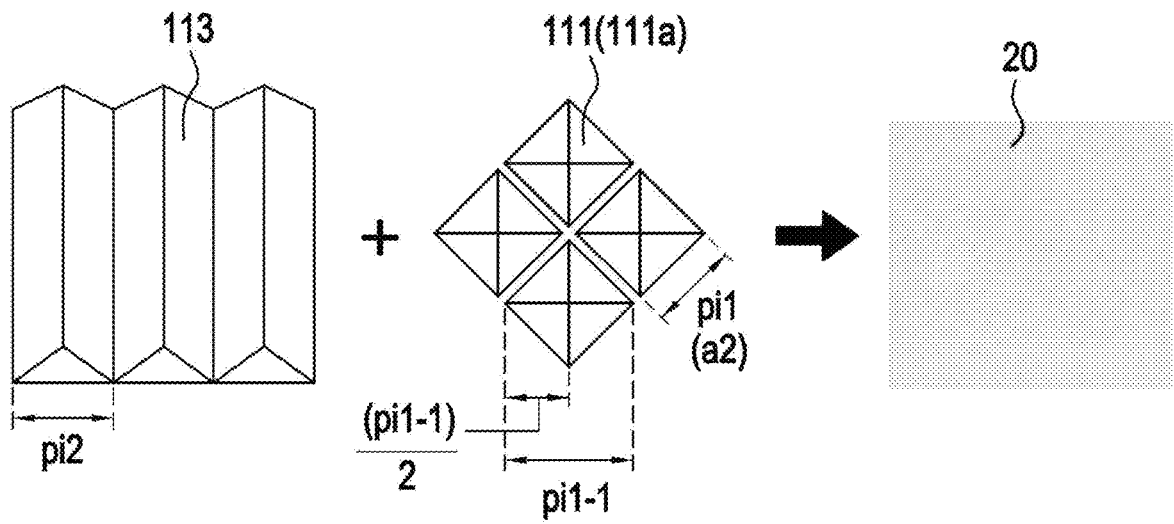
FIG. 6B is a liquid crystal panel image and drawings of a reversed prism pattern (a first prism pattern layer) and a pyramid pattern showing an outcome from an arrangement of the reversed prism pattern and the pyramid pattern according to an embodiment.

FIG. 6A is a liquid crystal panel image and drawings of a reversed prism pattern (a first prism pattern layer) and a pyramid pattern showing an outcome from an arrangement of the reversed prism pattern and the pyramid pattern according to a certain embodiment. FIG. 6B is a liquid crystal panel image and drawings of a reversed prism pattern (a first prism pattern layer) and a pyramid pattern showing an outcome from an arrangement of the reversed prism pattern and the pyramid pattern according to an embodiment.

It is very important for the optical film 100 of FIGS. 1 to 5B described above to have high brightness, but it may also be very important to prevent or minimize the moiré phenomenon. The moiré phenomenon will be described in detail below, but the moiré phenomenon may be easily occurred or never occurred by varying a parameter and/or a pattern arrangement of the pyramid pattern 111a of the pyramid pattern layer 111 and the prism pattern of the first prism pattern layer 113 (or the reversed prism pattern layer).

For example, as shown in FIGS. 6A and 6B, when the pyramid pattern 111a of the pyramid pattern layer 111 and the prism pattern of the first prism pattern layer 113 are arranged, the moiré phenomenon may be easily occurred or never occurred depending on the difference between the parameter of the pyramid pattern 111a and the parameter of the prism pattern (referred to as 'numerical difference in parameters'). Here, the parameter may be, for example, a parameter for length, and in this case, for example, 'numerical difference in parameters' may mean the difference between the pitch of the pyramid pattern and the pitch of the prism pattern.

According to an embodiment of the present disclosure, the pyramid pattern layer 111 may include a plurality of pyramid patterns 111a with a first pitch 'pi1' and the first prism pattern layer 113 (or the reversed prism pattern layer) may include a plurality of prism patterns with a second pitch 'pi2'. Here, the first pitch 'pi1' of the pyramid pattern 111a may be defined as the length of the sides 'a1' and 'a2' of the pyramid base. The difference in the numerical values of the patterns may mean the difference between the first pitch 'pi1' and the second pitch 'pi2'.

On the other hand, if the pyramid direction of one side of the pyramid base of the pyramid pattern 111a and the prism direction of the edge of the prism pattern does not form 0° or 90° but forms more than a predetermined angle (e.g. 30°), the numerical difference between the patterns can be compared with a first prime pitch 'pi1-1' corresponding to a diagonal length of the pyramid base of the pyramid pattern 111a rather than the first pitch 'pi1' corresponding to the length of the side of the pyramid base of the pyramid pattern 111a. In an embodiment of FIGS. 6A and 6B, it can be disclosed whether the moiré phenomenon may be occurred when the half of the diagonal length (pi1-1)/2 of the pyramid base of the pyramid pattern 113a, not the side lengths of the pyramid base 'a1', 'a2' of the pyramid pattern 113a, is compared with the pitch 'pi2' of the prism pattern.

For example, the moiré phenomenon may be occurred in the liquid crystal panel 20 shown in FIG. 6A, but the moiré phenomenon may not be occurred in the liquid crystal panel 20 shown in FIG. 6B. For example, FIG. 6A shows that the moiré phenomenon is occurred when the pitch 'pi2' of the prism pattern is 21 μm, the side length of the pyramid base of the pyramid pattern is 30 μm, and the half of the diagonal length of the pyramid pattern is 21.21 μm. For example, FIG. 6B shows that the moiré phenomenon is not occurred when the pitch 'pi2' of the prism pattern is 13 μm, the side length of the pyramid base of the pyramid pattern is 30 μm, and the half of the diagonal length of the pyramid base of the pyramid pattern is 21.21 μm. Through this, it can be confirmed that the moiré phenomenon may be occurred when the length of a certain parameter of the pyramid pattern (e.g., half of the diagonal length) and the pitch length of the prism pattern are similar, and that the moiré phenomenon may not be occurred when the length of the pitch of the prism pattern is similar. In some embodiments of the present specification, when the pitch of the pyramid pattern and the pitch of the prism pattern are similar, the term 'similar' means, for example, if they have the same value when the value below the decimal point at two different pitches in micrometers (μm) was discarded, they can be said to be similar. Alternatively, the term 'similar' may be said to be similar when, for example, the difference between two different pitches is less than 3% of the total pitch length of one pattern.

Figure 7:
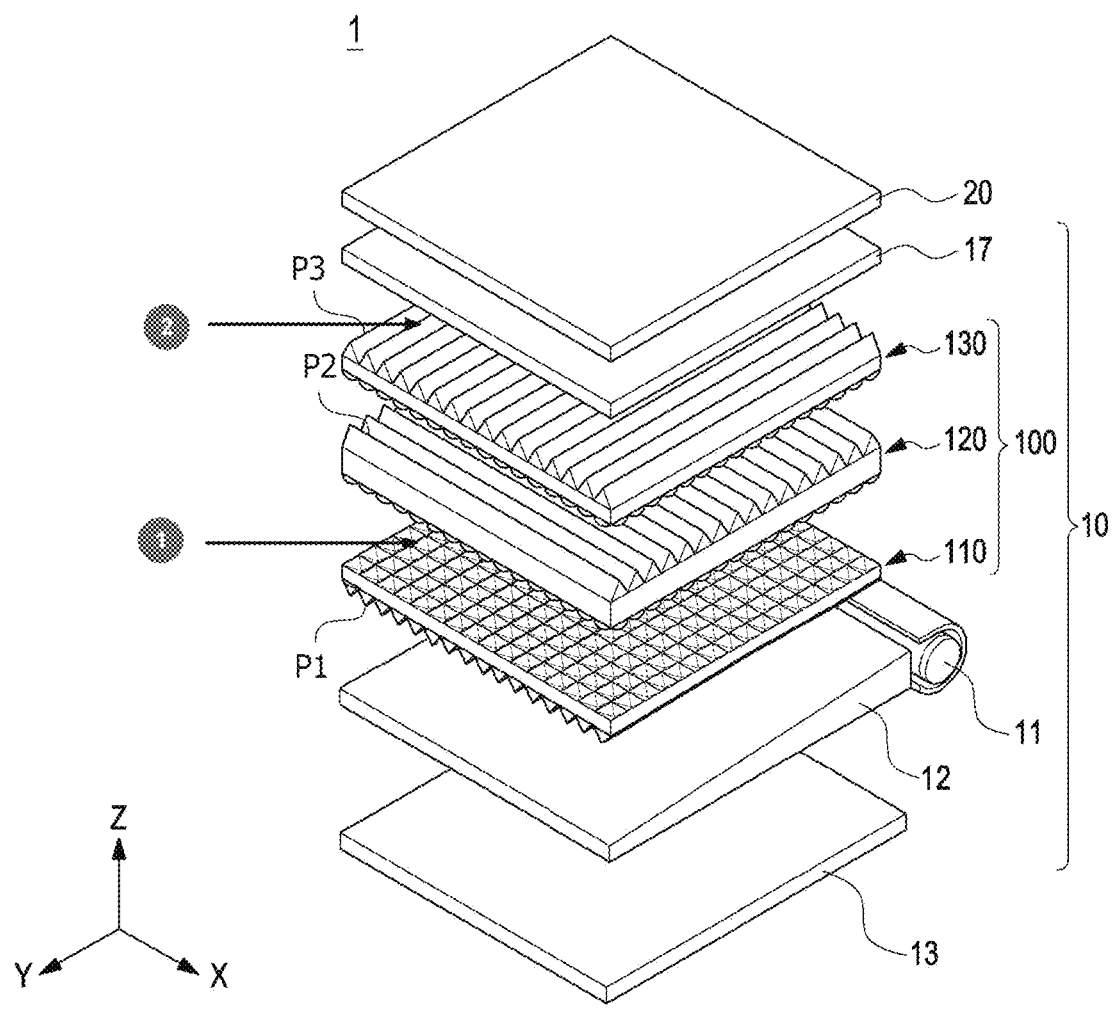
FIG. 7 is a perspective view showing a liquid crystal display (LCD) device including an optical film according to an embodiment.
Figure 8A:
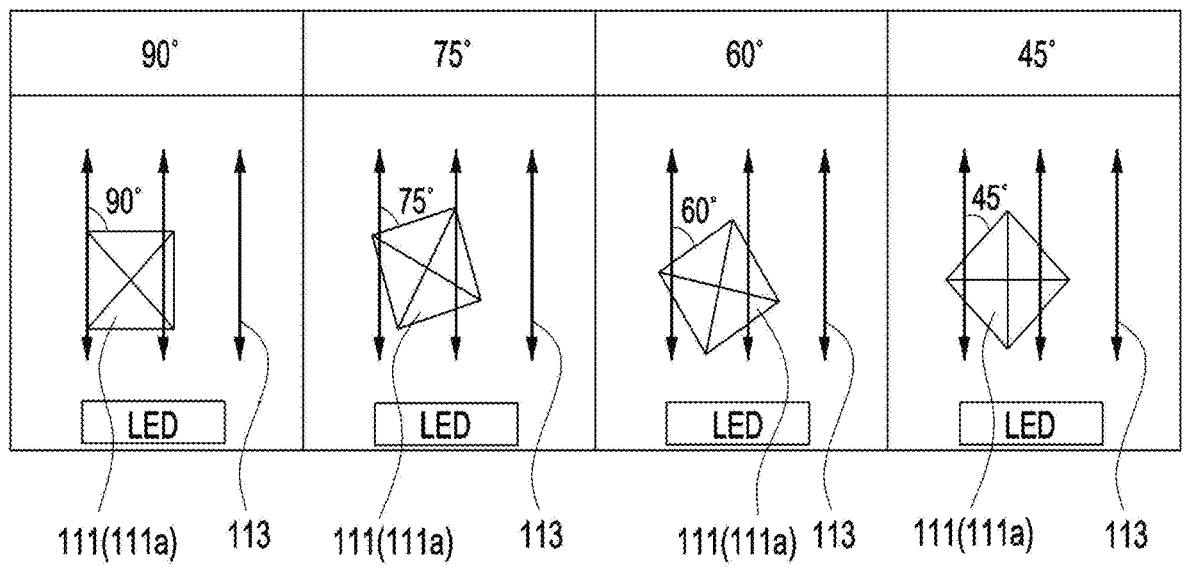
FIG. 8A is drawings illustrating an arrangement of a pyramid pattern and a prism pattern according to various embodiments.
Figure 8B:
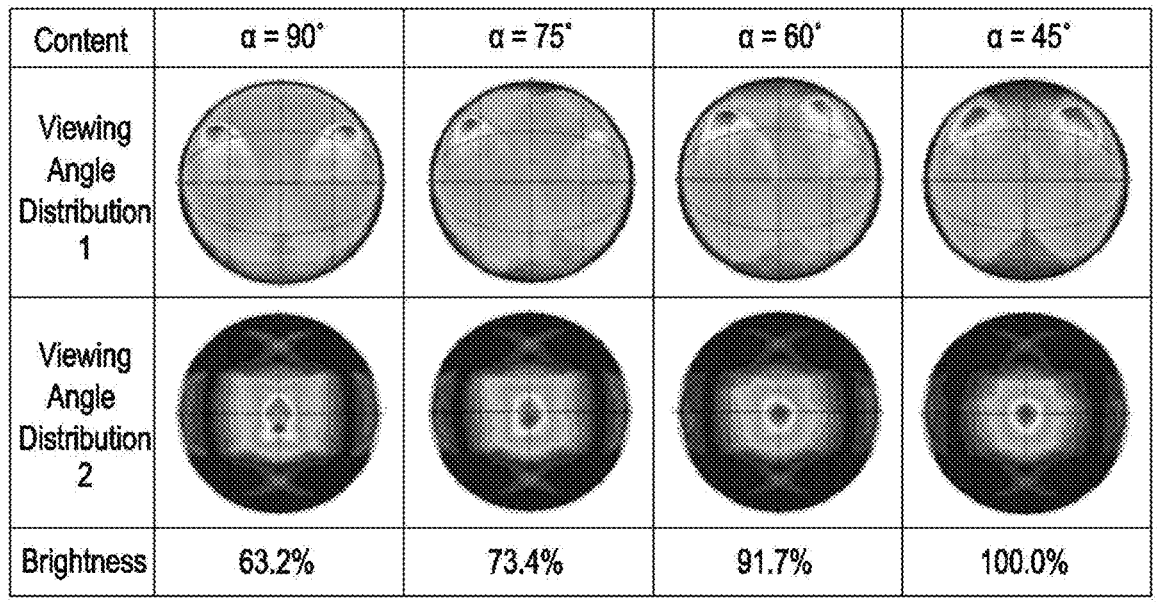
FIG. 8B is a table showing optical characteristics of an optical film according to various embodiments.
Figures 9A, 9B:
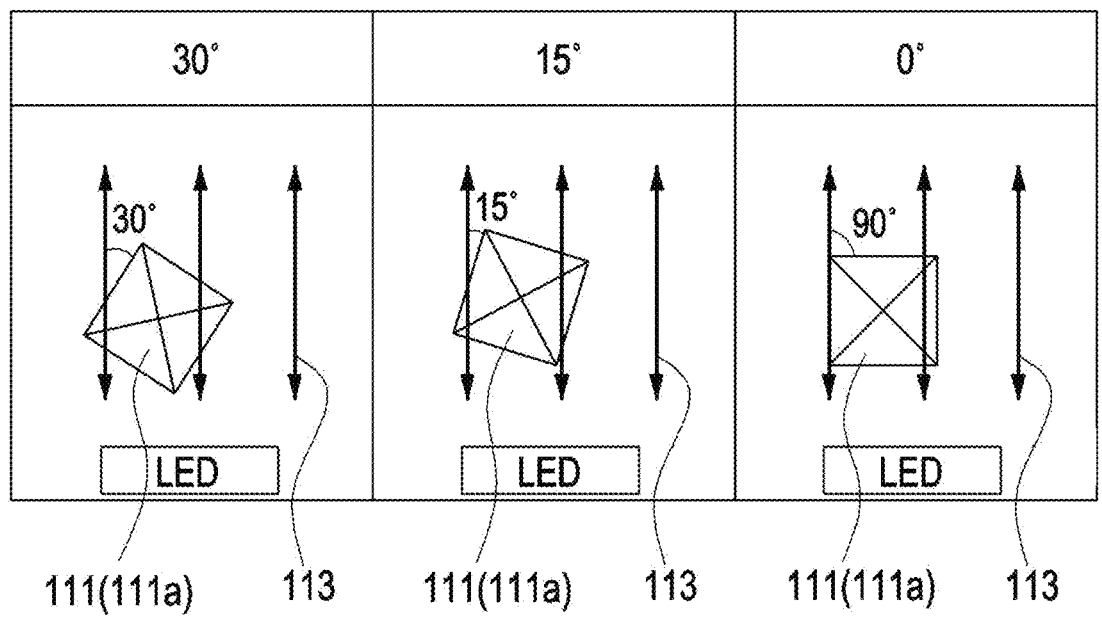
FIG. 9A is drawings illustrating an arrangement of a pyramid pattern and a prism pattern according to various embodiments.
FIG. 9B is a table showing optical characteristics of an optical film according to various embodiments.

FIG. 7 is a perspective view showing a liquid crystal display (LCD) device including an optical film according to an embodiment. FIG. 8A is drawings illustrating an arrangement of a pyramid pattern and a prism pattern according to various embodiments. FIG. 8B is a table showing optical characteristics of an optical film according to various embodiments. FIG. 9A is drawings illustrating an arrangement of a pyramid pattern and a prism pattern according to various embodiments. FIG. 9B is a table showing optical characteristics of an optical film according to various embodiments.

Through the embodiments of FIGS. 8A to 9B, various optical properties of the optical film according to various arrangements of the pyramid pattern 111a of the pyramid pattern layer 111 and the prism pattern of the first prism pattern layer 113 can be confirmed. Here, various arrangements of the pyramid pattern and prism pattern may mean various angle differences between the pyramid pattern and the prism pattern. The various angles between the pyramid pattern and the prism pattern may refer to the angle between one side of the pyramid base of the pyramid pattern and the edge direction (e.g., P1 in FIG. 1) of the prism pattern (e.g., the first prism pattern) (referred to as 'in-between angle α').

In embodiments in FIGS. 8A to 9B, simulation results can be shown by varying the angle difference between the pyramid pattern and the prism pattern in a case where the edge direction of the prism pattern is perpendicular to the arrangement direction of the light source (e.g., LED) (or in a case where the edge direction of the prism pattern is parallel to the incident direction of light emitted from a light source (e.g., LED)) when the side length of the pyramid base of the pyramid pattern is 30 μm and the pitch of the prism pattern is 21 μm. In FIGS. 8B and 9B, the viewing angle distribution 1 may show optical characteristics for light measured between the first sheet 110 and the second sheet 120 as shown in FIG. 7 and the viewing angle distribution 2 may show the optical characteristics for light measured between the third sheet 130 and the diffusion sheet 17.

Referring to FIGS. 8A and 8B, when the angle (a, alpha) formed between the pyramid direction of one side of the pyramid base of the pyramid pattern 111a and the edge direction (shown by an arrow) of the prism pattern is 90°, the brightness can be 63.2%, when the angle 'α' is 75°, the brightness can be 73.4%, and when the angle 'α' is 60°, the brightness can be 91.7%. Meanwhile, when the angle 'α' formed between the pyramid direction of one side of the pyramid base of the pyramid pattern 111a and the edge direction of the prism pattern (shown by an arrow) is 45°, the brightness may be 100.0%. Referring to FIGS. 9A and 9B, when the angle 'α' formed between the pyramid direction of one side of the pyramid base of the pyramid pattern 111a and the edge direction of the prism pattern (shown by an arrow) is 30°, the brightness may be 90.3%, when the angle 'α' is 15°, the brightness may be 74.4%, and when the angle 'α' is 0°, the brightness may be 64.4%. When all other conditions are the same as above, it can be seen that the brightness according to the angle 'α' formed between patterns has the highest value at an angle of 45° when going from 90° to 0°.

Through the embodiments in FIGS. 8A to 9B, it can be confirmed that the highest brightness can be achieved between the pyramid pattern 111a of the pyramid pattern layer 111 and the prism pattern of the first prism pattern layer 113 when the in-between angle 'α' formed between the pyramid direction of one side of the pyramid base of the pyramid pattern 111a and the edge direction of the prism pattern is 45°. From another perspective, it may be viewed as having the highest brightness when the diagonal length direction of the pyramid base of the pyramid pattern 111a of the pyramid pattern layer 111 and the edge direction of the prism pattern are perpendicular to each other.

Figure 10A:
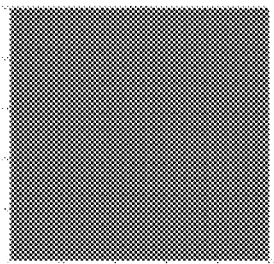
FIG. 10A is a table showing the moiré phenomenon simulation results according to various embodiments.
Figure 10A:
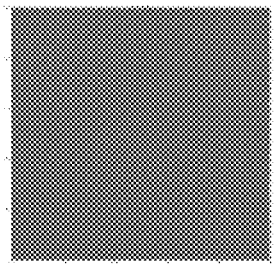
Figure 10A:
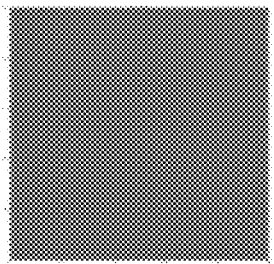
Figure 10A:
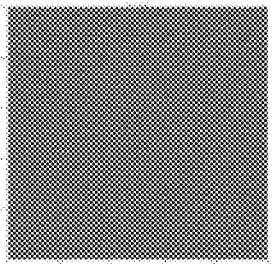
Figure 10A:
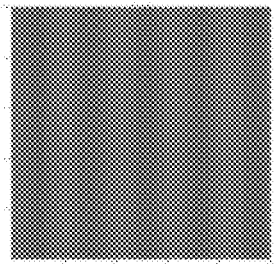
Figure 10A:
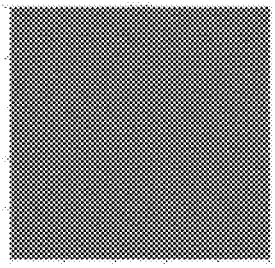
Figure 10A:
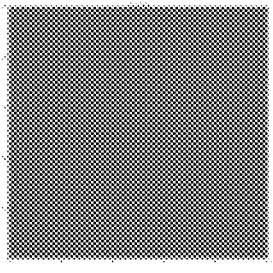
Figure 10A:
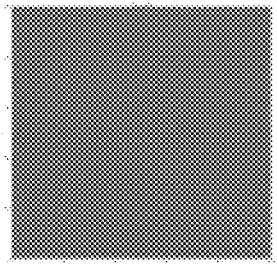
Figure 10A:
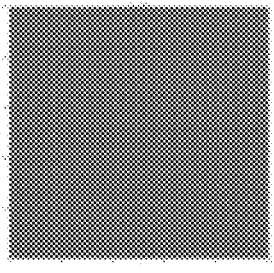
Figure 10B:
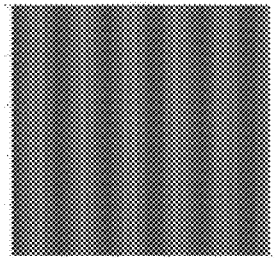
FIG. 10B is a table showing the moiré phenomenon simulation results according to various embodiments.

FIG. 10A is a table showing the moiré phenomenon simulation results according to various embodiments. FIG. 10B is a table showing the moiré phenomenon simulation results according to various embodiments.

FIGS. 10A and 10B show the results of the moiré phenomenon simulation of the optical film 100 with respect to the angle (in-between angle, a) formed between the pyramid direction of the pyramid pattern 111a of the pyramid pattern layer 111 and the prism edge direction of the prism pattern of the first prism pattern layer 113. FIG. 10A shows the degree of the moiré phenomenon with respect to various angles (in-between angle, a) when the side length of the pyramid base of the pyramid pattern 111a of the pyramid pattern layer 111 is 30 μm and the pitch of the prism pattern of the first prism pattern layer 113 is 21 μm. FIG. 10B shows the degree of the moiré phenomenon with respect to various angles (in-between angle, α) when the side length of the pyramid base of the pyramid pattern 111a of the pyramid pattern layer 111 is 30 μm and the pitch of the prism pattern of the first prism pattern layer 113 is 30 μm. Here, the moiré phenomenon can be observed in the liquid crystal panel 20 of FIG. 1.

Referring to FIG. 10A, it can be confirmed that the degree of the moiré phenomenon occurrence is the greatest at 45° when the pyramid pattern 111a of the pyramid pattern layer 111 and the prism pattern of the first prism pattern layer 113 has the in-between angle 'α' of 0°, 15°, 30°, 40°, 45°, 50°, 60°, 75°, and 90°, respectively. In addition, it can be confirmed that some moiré phenomenon is occurred even at 40° and 50° which are around 45°. Referring to FIG. 10B, it can be confirmed that the degree of moiré phenomenon occurrence is the greatest at 0° and 90°. In FIG. 10B, unlike FIG. 10A, it can be confirmed that moiré phenomenon is not occurred at 45°. As can be seen through the embodiments of FIGS. 10A and 10B, for example, when the in-between angle 'α' formed between the pyramid direction of one side of the pyramid base of the pyramid pattern 111a and the edge direction (shown by an arrow) of the prism pattern is 0°, 45°, or 90°, the moiré phenomenon may be occurred depending on the relationship between the length of the side of the pyramid base and/or the diagonal of the pyramid base of the pyramid pattern and the pitch of the prism pattern.

For example, if the length of one side of the pyramid base of the pyramid pattern 111a and the pitch of the prism pattern are similar, the moiré phenomenon may be occurred when the in-between angle 'α' formed between the pyramid direction of one side of the pyramid base of the pyramid pattern 111a and the edge direction of the prism pattern is 0° or 90°. In addition, for example, when the half of the diagonal length of the pyramid base of the pyramid pattern 111a and the pitch of the prism pattern are similar, the moiré phenomenon may be occurred when the in-between angle 'α' formed between the pyramid direction of one side of the pyramid base of the pyramid pattern 111a and the edge direction of the prism pattern is 45°. As such, to provide an optical film having high brightness characteristics without causing the moiré phenomenon, it must be designed by considering the angle (in-between angle) formed between the pyramid pattern and the prism pattern as well as the numerical relationship of the parameters. Below, referring to FIGS. 11A to 11D, the in-between angle and the pitch length conditions for providing an optical film having high brightness characteristics without causing the moiré phenomenon will be examined in more detail.

Figure 11A:
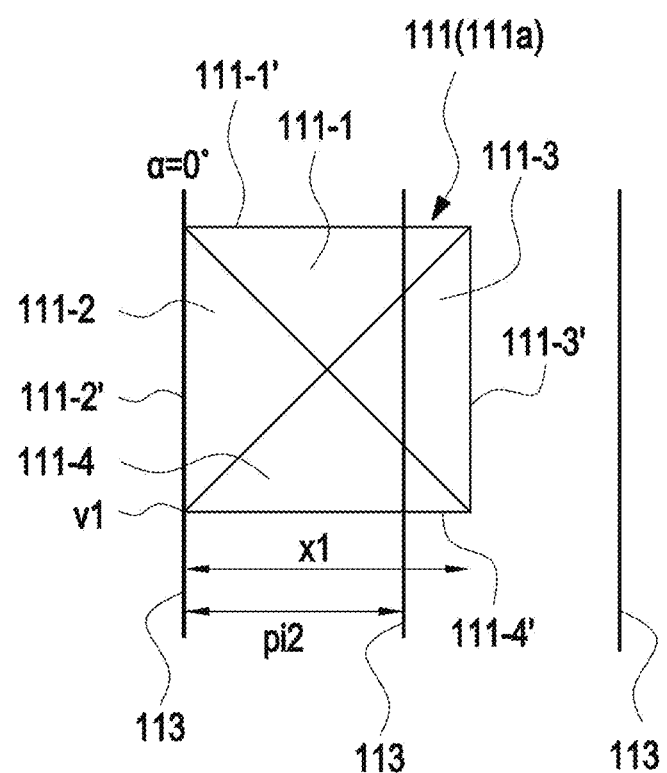
FIG. 11A is a drawing showing an arrangement of a pyramid pattern and a prism pattern according to an embodiment.
Figure 11B:
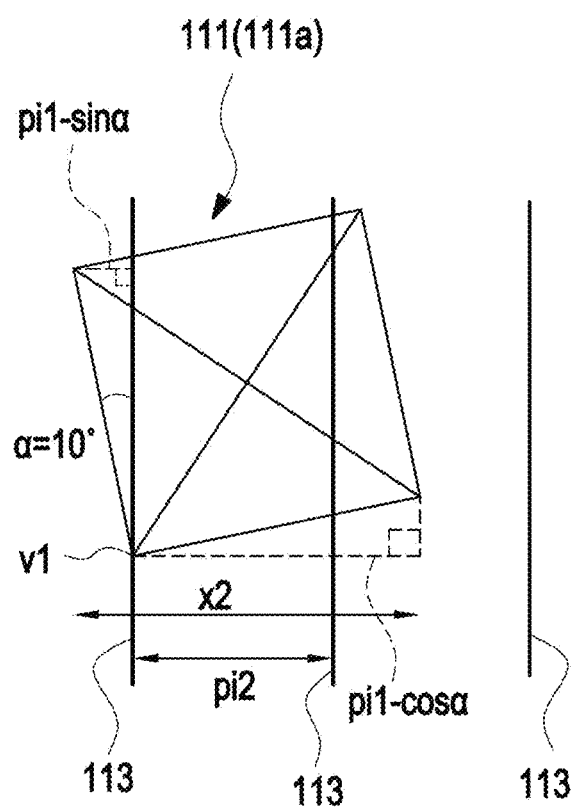
FIG. 11B is a drawing showing an arrangement of a pyramid pattern and a prism pattern according to an embodiment.
Figure 11C:
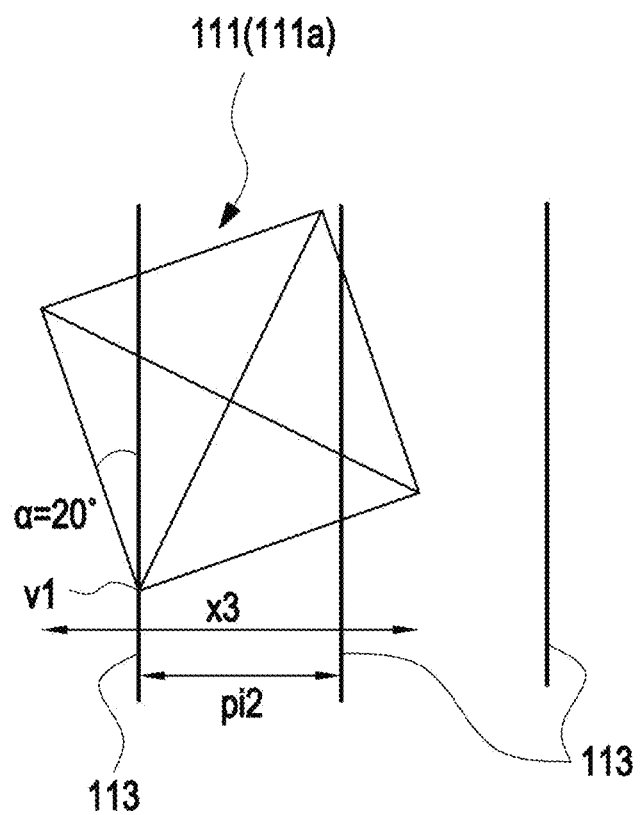
FIG. 11C is a drawing showing an arrangement of a pyramid pattern and a prism pattern according to an embodiment.
Figure 11D:
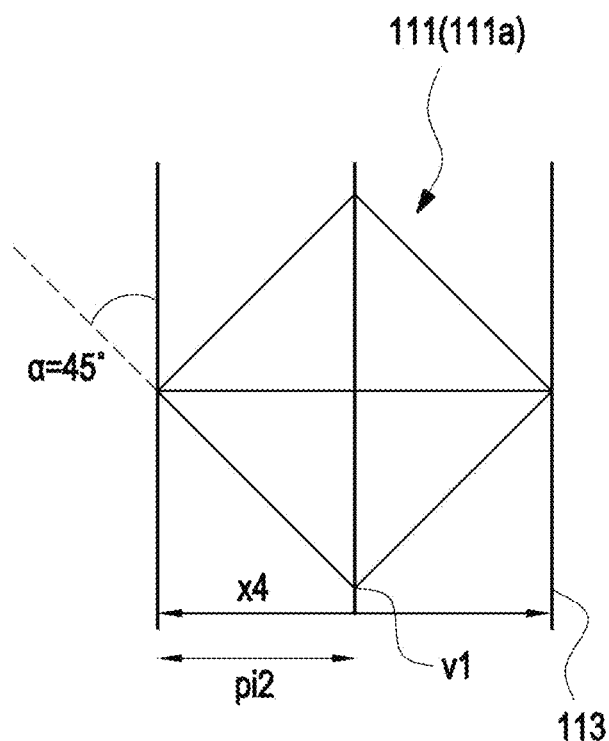
FIG. 11D is a drawing showing an arrangement of a pyramid pattern and a prism pattern according to one embodiment.

FIG. 11A is a drawing showing an arrangement of a pyramid pattern and a prism pattern according to an embodiment. FIG. 11B is a drawing showing an arrangement of a pyramid pattern and a prism pattern according to an embodiment. FIG. 11C is a drawing showing an arrangement of a pyramid pattern and a prism pattern according to an embodiment. FIG. 11D is a drawing showing an arrangement of a pyramid pattern and a prism pattern according to one embodiment.

FIGS. 11A to 11D show the arrangement relationship between the pyramid pattern 111a of the pyramid pattern layer 111 and the prism pattern of the first prism pattern layer 113, and they are the ones for varying the in-between angles formed between the pyramid direction of one side of the pyramid base of the pyramid pattern 111a and the prism pattern while one vertex v1 of the pyramid patter 111a is fixed to the edge of the prism pattern. FIG. 11A shows when the in-between angle 'α' formed between the pyramid direction of one side of the pyramid base of the pyramid pattern 111a and the prism pattern is 0°, FIG. 11B shows when the in-between angle 'α' formed between the pyramid direction of one side of the pyramid base of the pyramid pattern 111a and the prism pattern may be 10°, FIG. 11C shows when the in-between angle 'α' formed between one side of the pyramid base of the pyramid pattern 111a and the prism pattern may be 20°, and FIG. 11D shows when the in-between angle 'α' formed between the pyramid direction of one side of the pyramid base of the pyramid pattern 111a and the prism pattern may be 45°. In FIGS. 11A to 11D, the pyramid pattern 111a having the four side surfaces 111-1, 111-2, 111-3, 111-4 and the corresponding four sides of the pyramid base 111-1', 111-2', 111-3', 111-4' is disclosed. As a reference for the in-between angle formed between the pyramid pattern and the prism pattern, the second side 111-2' of the pyramid base of the pyramid pattern 111a can be used, but this is only an example and another side of the pyramid base (e.g., the first side of the pyramid base 111-1', the third side of the pyramid base 111-3', and the fourth side of the pyramid base 111-4') may also be used.

In the present disclosure, the pyramid pattern 111a may have the pyramid base of square shape. For example, the four sides of the pyramid base 111-1', 111-2', 111-3', 111-4' may have substantially the same length, respectively. Here, the expression 'having substantially the same length' may mean that each side has the same length within a predetermined margin of error.

Referring to FIGS. 11A to 11D together, as the in-between angle formed between the pyramid direction of one side of the pyramid base of the pyramid pattern 111a and the prism pattern varies, the dominant pitch of the pyramid pattern 111a, which affects the moiré phenomenon, may be varied. Here, the dominant pitch may mean that a pitch that has a greater influence on the moiré phenomenon among the first pitch 'pi1' corresponding to the length of the side of the pyramid base of the pyramid pattern 111a and the first prime pitch 'pi1-1' corresponding to the diagonal length of the pyramid base of the pyramid pattern 111a. For example, referring to FIG. 11A, when the in-between angle 'α' formed between the pyramid direction of one side of the pyramid base of the pyramid pattern 111a and the prism pattern may be 0°, the first pitch 'pi1' corresponding to the length of the side of the pyramid base (e.g., the fourth side of the pyramid base 111-4') of the pyramid pattern 111a may be the dominant pitch 'x1'. The first prime pitch 'pi1-1' corresponding to the diagonal length of the pyramid pattern 111a may be the dominant pitch 'x1' if the first pitch 'pi1' maintains the dominant pitch until the in-between angle 'α' formed between the pyramid direction of one side of the pyramid base of the pyramid pattern 111a and the prism pattern has a predetermined angle difference (e.g., less than approximately 10°), and then the in-between angle is increased beyond the predetermined angle difference. Referring to FIG. 11B, when the in-between angle 'α' formed between the pyramid direction of one side of the pyramid base of the pyramid pattern 111a and the prism pattern may be 10°, the first prime pitch 'pi1-1' corresponding to the diagonal length of the pyramid pattern 111a may be the dominant pitch 'x2'. Referring to FIG. 11C, when the in-between angle 'α' formed between the pyramid direction of one side of the pyramid base of the pyramid pattern 111a and the prism pattern may be 20°, the first prime pitch 'pi1-1' corresponding to the diagonal length of the pyramid base of the pyramid pattern 111a may be the dominant pitch 'x3'. Referring to FIG. 11D, when the in-between angle 'α' formed between the pyramid direction of one side of the pyramid base of the pyramid pattern 111a and the prism pattern may be 45°, the first prime pitch 'pi1-1' corresponding to the diagonal length of the pyramid base of the pyramid pattern 111a may be the dominant pitch 'x4'.

Referring to FIGS. 10A and 10B again, in a case where the length of one side of the pyramid base of the pyramid pattern 111a and the pitch of the prism pattern are similar, the moiré phenomenon may be occurred when the in-between angle 'α' formed between the pyramid direction of one side of the pyramid base of the pyramid pattern 111a and the edge direction of the prism pattern is 0° or 90°. Also, for example, in a case where the half of the diagonal length of the pyramid base of the pyramid pattern 111a and the pitch of the prism pattern are similar, the moiré phenomenon may be occurred when the in-between angle 'α' formed between the pyramid direction of one side of the pyramid base of the pyramid pattern 111a and the edge direction of the prism pattern is 45°. Referring to FIG. 11A again, when the in-between angle 'α' formed between the pyramid direction of one side of the pyramid base of the pyramid pattern 111a and the edge direction of the prism pattern is 0° or 90°, the first pitch 'pi1' corresponding to the length of the side of the pyramid base of the pyramid pattern 111a becomes the dominant pitch 'x1' thereby causing the moiré phenomenon when the first pitch is similar to the second pitch 'pi2' of the prism pattern. Referring to FIGS. 11B to 11D again, when the in-between angle 'α' formed between the pyramid direction of one side of the pyramid base of the pyramid pattern 111a and the edge direction of the prism pattern is not 0° or 90° (e.g., 10° to 80°), the first prime pitch 'pi1-1' corresponding to the diagonal length of the pyramid base of the pyramid pattern 111a becomes the dominant pitch 'x2', 'x3', 'x4' thereby causing the moiré phenomenon when the half of the first prime pitch is similar to the second pitch 'pi2' of the prism pattern.

The pitch relationship at which the moiré phenomenon is not occurred for the optical film 100 can be summarized in Equations as follows. To prevent the moiré phenomenon from being occurred for the optical film 100, Equation 1 or Equation 2 below must be satisfied.

$$\frac{n \cdot (pi1-1)}{2} < pi2 < n \cdot pi1 \text{ or} \qquad \text{[Equation 1]}$$

$$\frac{n \cdot (pi1-1)}{2} > pi2 \qquad \text{[Equation 2]}$$

Here, 'n' may be a natural number. Because the second pitch 'pi2' should not be matched with multiples of (pi1-1)/2 or multiples of 'pi1' to prevent the moiré phenomenon being occurred, a value where 'n' times the value of (pi1-1)/2 and the value of 'pi1' was applied in Equation 1 and Equation 2.

Referring to FIG. 11B, when the in-between angle 'α' formed between the pyramid direction of one side of the pyramid base of the pyramid pattern 111a and the edge direction of the prism pattern may be a predetermined angle (e.g., 10° or more), the first prime pitch 'pi1-1' corresponding to the diagonal length of the pyramid base of the pyramid pattern 111a becomes the dominant pitch, and the moiré phenomenon cannot be occurred if the half of the first prime pitch (pi1-1)/2 should not be matched with the second pitch 'pi2'. Through the illustration of FIG. 11B, generalizing FIGS. 11B to 11D results in the following equation. To prevent the moiré phenomenon from being occurred for the optical film 100, Equation 3 below must be satisfied.

$$\frac{n \cdot pi1 \cdot (\sin\alpha + \cos\alpha)}{2} \neq pi2 \qquad \text{[Equation 3]}$$

Here, 'n' may be a natural number. Because the second pitch 'pi2' should not be matched with multiples of (pi1(sin α+cos α))/2 to prevent the moiré phenomenon from being occurred, a value where n times the value of (pi1(sin α+cos α))/2 was applied in Equation 3.

In addition to the condition where the moiré phenomenon is not occurred, the optical film 100 can satisfy Equation 4 to exhibit high brightness of 90% or more with reference to FIGS. 8B and 9B.

$$30° < \alpha < 60° \quad \text{[Equation 4]}$$

FIG. 12 is a table comparing an embossed pyramid pattern and an intaglio pyramid pattern according to various embodiments. According to various embodiments of the present disclosure, the pyramid pattern 111a of the pyramid pattern layer 111 may be formed as intaglio. Referring to FIG. 12, it can be seen as to the difference in brightness value, incident angle θ, and viewing angle Φ for the combination of the intaglio pyramid pattern and the reversed prism pattern compared to the combination of the embossed pyramid pattern and the reversed prism pattern.

Compared to the combination of the embossed pyramid pattern and the reversed prism pattern, the combination of the intaglio pyramid pattern and the reversed prism pattern has better light concentrating efficiency and can have a higher brightness value. The incidence and viewing angles of the combination of the intaglio pyramid pattern and the reversed prism pattern are narrower than those of the combination of the embossed pyramid pattern and the reversed prism pattern. This can be interpreted as the incident and viewing angles moving to the center thereby increasing light concentrating efficiency.

In addition, for the embossed pyramid pattern, because the physical peak portions (e.g., barrier ribs 111-5, 111-6 in FIG. 4E) are vulnerable to damage, it may be more advantageous to apply the intaglio pyramid pattern rather than to apply the embossed pyramid pattern. According to an embodiment, the intaglio pyramid pattern applied to the present disclosure may be referred to as a 'waffle-type pyramid pattern.'

Figure 13:
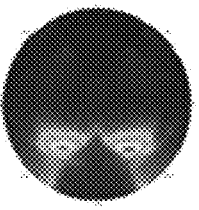
FIG. 13 is a table showing optical characteristics according to the refractive index of a pyramid pattern and a reversed prism pattern according to various embodiments.
Figure 13:
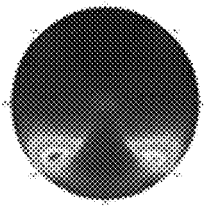
Figure 13:
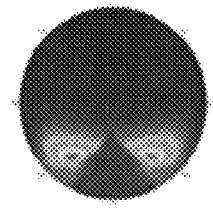
Figure 13:
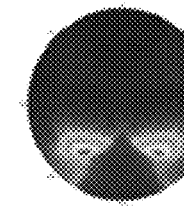

FIG. 13 is a table showing optical characteristics according to the refractive index of a pyramid pattern layer (referred to as 'pyramid refractive index') and a reversed prism pattern layer according to various embodiments. In FIG. 13, the alphabet n indicating the refractive index may be shown in front of the number.

According to an embodiment, when considering brightness and color coordinates, it may be advantageous to have the refractive index of the pyramid pattern 111a of the pyramid pattern layer 111 and the refractive index of the prism pattern (reversed prism pattern) of the first prism pattern layer 113 being smaller than the refractive index of the first base portion 112.

Referring to FIG. 13, for example, when the refractive index (PET refractive index) of the base portion 120 of the first sheet 110 is 1.65, if the refractive index of the pyramid pattern 111a of the pyramid pattern layer 111 (abbreviated as 'pyramid refractive index') is varied from 1.49 to 1.58, and then sequentially varied to 1.69 while the refractive index of the prism pattern (reversed prism pattern) of the first prism pattern layer 113 (abbreviated as 'reversed prism refractive index') is fixed at 1.49, changes in optical properties may be occurred. Here, changes in optical characteristics may include, for example, changing of viewing angle distribution, brightness, color coordinates (e.g. Δy), angle of incidence θ, and viewing angle Φ, but for convenience, we will focus on changes in brightness value.

As shown in FIG. 13, when sequentially comparing an embodiment with a pyramid refractive index of 1.49 (e.g., example 2-1), an embodiment with a pyramid refractive index of 1.58 (e.g., example 2-2), and an embodiment with a pyramid refractive index of 1.69 (e.g., example 2-3) while the refractive index (PET refractive index) of the base portion 120 is 1.65 and the reversed prism refractive index is fixed to a low refractive index (e.g., reversed prism refractive index of 1.49), it can be confirmed that the brightness has been changed. For example, when the pyramid refractive index is close to or has a higher value (e.g., 1.69) than the refractive index of the base portion 120 (i.e., when the pyramid refractive index is higher than the refractive index of the base portion (e.g., example 2-3)), it can be confirmed that the brightness value is significantly lowered compared to the cases where the pyramid refractive index is 1.49 and 1.58 (i.e., when the pyramid refractive index is lower than the refractive index of the base (e.g., example 2-1, 2-2, 2-4)).

Referring to another embodiment of FIG. 13 (e.g., example 2-4), when the refractive index (PET refractive index) of the base portion 120 is 1.65, it can be confirmed that the brightness is decreased even when the refractive index of the portion 120 is close to or has a higher value (e.g., 1.69) (i.e., when the refractive index of the reversed prism is higher than the refractive index of the base portion) even if the pyramid refractive index is 1.49 which is a low refractive index. Referring to the various embodiments of FIG. 13, when each of the refractive index of the reversed prism and the refractive index of the pyramid is smaller than the refractive index of the base portion (e.g., example 2-1, 2-2), a high brightness value may be achieved. However, when at least one of the refractive index of the reversed prism and the refractive index of the pyramid is higher than the refractive index of PET (e.g., examples 2-3, 2-4), it can be confirmed that it does not have a higher brightness value than when each of the refractive index of the reversed prism and the refractive index of the pyramid is smaller than the refractive index of the base portion (e.g., example 2-1, 2-2). In summary, embodiments where the refractive index of the reversed prism and the refractive index of the pyramid are both formed to be lower than the refractive index of the base portion can be applied to the present disclosure.

It should be noted, however, that the specific values of the refractive index shown in FIG. 13 are exemplary except the characteristics of the high-low relationship among the refractive index of the base (PET refractive index), the pyramid refractive index, and the prism refractive index which are factors causing the deterioration of the optical properties. Accordingly, the values of the base portion refractive index (PET refractive index), the pyramid refractive index, and the prism refractive index may be partially changed depending on the embodiment.

According to an embodiment of the present disclosure, the optical film may include the first base portion; the pyramid pattern layer where a plurality of pyramid patterns having the first pitch 'pi1' are formed on the first surface of the first base portion; and the first prism pattern layer where a plurality of prism patterns having the second pitch 'pi2' are formed on the second surface of the first base portion. The optical film may satisfy Equation 1 or Equation 2 when the diagonal length of the pyramid pattern has the first prime pitch 'pi1-1':

$$\frac{n \cdot (pi1-1)}{2} < pi2 < n \cdot pi1 \text{ or} \quad \text{[Equation 1]}$$

$$\frac{n \cdot (pi1-1)}{2} > pi2, \quad \text{[Equation 2]}$$

where n is a natural number.

According to an embodiment, the optical film may satisfy Equation 3 with respect to the in-between angle 'α' formed between the pyramid direction of one side of the pyramid base of the pyramid pattern and the edge direction of the prism pattern:

$$\frac{n \cdot pi1 \cdot (\sin\alpha + \cos\alpha)}{2} \neq pi2,$$ [Equation 3]

where n is a natural number.

According to an embodiment, the in-between angle 'α' formed between the pyramid direction of one side of the pyramid base of the pyramid pattern and the edge direction of the prism pattern may satisfy Equation 4:

$$30° < \alpha < 60°$$ [Equation 4].

According to an embodiment, the plurality of pyramid patterns may be formed as intaglio. According to an embodiment, the second sheet disposed over the first sheet may further include the second base portion and a second prism pattern layer having a plurality of prism patterns formed on the first surface of the second base portion. According to an embodiment, the second sheet may include the first diffusion layer formed on the second surface of the second base portion and facing the pyramid pattern layer.

According to an embodiment, the third sheet is disposed over the second sheet may further include the third base portion and the third prism pattern layer having a plurality of prism patterns formed on the first surface of the third base portion. According to an embodiment, the third sheet may include the second diffusion layer formed on the second surface of the third base portion and facing the second prism pattern layer.

According to an embodiment, the plurality of first prism patterns may have edges formed toward the first prism direction, the plurality of second prism patterns may have edges formed toward the second prism direction, and the plurality of third prism patterns may have edges formed toward the third prism direction which is perpendicular to the second prism direction. According to an embodiment, each of the refractive index of the pyramid pattern layer and the refractive index of the first prism pattern layer may be smaller than the refractive index of the base portion.

The backlight unit comprising the optical film according to the above-described embodiment may include an edge-type light source and the optical film disposed over the light source. According to an embodiment, the edge-type light source may be arranged in the first direction perpendicular to the third prism direction and may be formed to irradiate light in the second direction parallel to the third prism direction.

The optical film of various embodiments of the present disclosure described above and the backlight unit including the optical film are not limited to the above-described embodiments and drawings. Moreover, various substitutions, modifications, and changes are possible for those skilled in the art within the technical scope of the present disclosure. The effects that can be obtained from the present disclosure are not limited to the effects mentioned above, and other effects not mentioned can be clearly understood by those skilled in the art from the description above.

The invention claimed is:

1. An optical film comprising:
a first optical sheet including a first base portion;
a pyramid pattern layer including a plurality of pyramid patterns formed on a first surface of the first base portion and a first side of a pyramid base of the pyramid pattern arranged in a pyramid direction; and
a first prism pattern layer including a plurality of first prism patterns formed on a second surface of the first base portion and an edge of the first prism pattern arranged in a first prism direction,
wherein the optical film satisfies either Equation 1 or Equation 2:

$$\frac{n \cdot (pi1 - 1)}{2} < pi2 < n \cdot pi1 \text{ or}$$ [Equation 1]

$$\frac{n \cdot (pi1 - 1)}{2} > pi2,$$ [Equation 2]

wherein pi1 is a first pitch corresponding to a length of the first side of the pyramid base of the pyramid pattern; pi1-1 is a first prime pitch corresponding to a diagonal length of the pyramid base of the pyramid pattern; pi2 is a second pitch corresponding to a base length of the first prism pattern; and n is a natural number.

2. The optical film of claim 1, wherein the optical film satisfies the Equation 3:

$$\frac{n \cdot pi1 \cdot (\sin\alpha + \cos\alpha)}{2} \neq pi2,$$ [Equation 3]

wherein α is an angle formed between the pyramid direction of the first side of the pyramid base of the pyramid pattern and the first prism direction of the edge of the first prism pattern and n is the natural number.

3. The optical film of claim 2, wherein the optical film satisfies the Equation 4:

$$30° < \alpha < 60°$$ [Equation 4]

wherein α is the angle formed between the pyramid direction of the first side of the pyramid base of the pyramid pattern and the first prism direction of the edge of the first prism pattern and n is the natural number.

4. The optical film of claim 1, wherein the plurality of pyramid patterns is formed as intaglio pyramid patterns.

5. The optical film of claim 1 further comprising:
a second optical sheet including a second base portion; and
a second prism pattern layer having a plurality of second prism patterns formed on a first surface of the second base portion and an edge of the second prism pattern arranged in a second prism direction,
wherein the second optical sheet is disposed over the first optical sheet.

6. The optical film of claim 5, wherein the second optical sheet includes a first diffusion layer formed on a second surface of the second base portion and the first diffusion layer faces the pyramid pattern layer.

7. The optical film of claim 5 further comprising:
a third optical sheet including a third base portion; and
a third prism pattern layer having a plurality of third prism patterns formed on a first surface of the third base portion and an edge of the third prism pattern arranged in a third prism direction,
wherein the third optical sheet is disposed over the second optical sheet.

8. The optical film of claim 7, the third optical sheet includes a second diffusion layer formed on a second surface of the third base portion and the second diffusion layer faces the second prism pattern layer.

9. The optical film of claim 7, wherein the third prism direction of the edge of the third prism pattern is substantially perpendicular to the second prism direction of the edge of the second prism pattern.

10. The optical film of claim 1, wherein a refractive index of the pyramid pattern layer and a refractive index of the first prism pattern layer are smaller than a refractive index of the first base portion, respectively.

11. A backlight unit comprising:
an edge type light source; and
an optical film disposed over the light source further comprising:
a first optical sheet including a first base portion;
a pyramid pattern layer including a plurality of pyramid patterns formed on a first surface of the first base portion and a first side of a pyramid base of the pyramid pattern arranged in a pyramid direction; and
a first prism pattern layer including a plurality of first prism patterns formed on a second surface of the first base portion and an edge of the first prism pattern arranged in a first prism direction,
wherein the optical film satisfies either Equation 5 or Equation 6:

$$\frac{n \cdot (pi1-1)}{2} < pi2 < n \cdot pi1 \text{ or} \quad \text{[Equation 5]}$$

$$\frac{n \cdot (pi1-1)}{2} > pi2, \quad \text{[Equation 6]}$$

wherein pi1 is a first pitch corresponding to a length of the first side of the pyramid base of the pyramid pattern; pi1-1 is a first prime pitch corresponding to a diagonal length of the pyramid base of the pyramid pattern; pi2 is a second pitch corresponding to a base length of the first prism pattern; and n is a natural number.

12. The backlight unit of claim 11, wherein the optical film satisfies the Equation 7:

$$\frac{n \cdot pi1 \cdot (\sin\alpha + \cos\alpha)}{2} \neq pi2, \quad \text{[Equation 7]}$$

wherein $\alpha$ is an angle formed between the pyramid direction of the first side of the pyramid base of the pyramid pattern and the first prism direction of the edge of the first prism pattern and n is the natural number.

13. The backlight unit of claim 12, wherein the optical film satisfies the Equation 8:

$$30° < \alpha < 60° \quad \text{[Equation 8]}$$

wherein $\alpha$ is an angle formed between the pyramid direction of the first side of the pyramid base of the pyramid pattern and the first prism direction of the edge of the first prism pattern and n is the natural number.

14. The backlight unit of claim 11, wherein the plurality of pyramid patterns is formed as intaglio pyramid patterns.

15. The backlight unit of claim 11 further comprising:
a second optical sheet including a second base portion; and
a second prism pattern layer having a plurality of second prism patterns formed on a first surface of the second base portion and an edge of the second prism pattern arranged in a second prism direction,
wherein the second optical sheet is disposed over the first optical sheet.

16. The backlight unit of claim 15, wherein the second optical sheet includes a first diffusion layer formed on a second surface of the second base portion and the first diffusion layer faces the pyramid pattern layer.

17. The backlight unit of claim 15 further comprising:
a third optical sheet including a third base portion; and
a third prism pattern layer having a plurality of third prism patterns formed on a first surface of the third base portion and an edge of the third prism pattern arranged in a third prism direction,
wherein the third prism direction of the edge of the third prism pattern is substantially perpendicular to the second prism direction of the edge of the second prism pattern and the third optical sheet is disposed over the second optical sheet.

18. The backlight unit of claim 17, the third optical sheet includes a second diffusion layer formed on a second surface of the third base portion and the second diffusion layer faces the second prism pattern layer.

19. The backlight unit of claim 17, wherein the edge type light source is arranged in a first direction substantially perpendicular to the first prism direction and is formed to irradiate light in a second direction substantially parallel to the first prism direction.

20. The backlight unit of claim 11, wherein a refractive index of the pyramid pattern layer and a refractive index of the first prism pattern layer are smaller than a refractive index of the first base portion, respectively.

* * * * *